(12) United States Patent
Nishimura

(10) Patent No.: US 11,902,483 B2
(45) Date of Patent: Feb. 13, 2024

(54) IMAGE READING APPARATUS

(71) Applicant: SEIKO EPSON CORPORATION, Tokyo (JP)

(72) Inventor: Yoichiro Nishimura, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/935,608

(22) Filed: Sep. 27, 2022

(65) Prior Publication Data

US 2023/0096448 A1 Mar. 30, 2023

(30) Foreign Application Priority Data

Sep. 30, 2021 (JP) ................. 2021-160517

(51) Int. Cl.
*H04N 1/00* (2006.01)

(52) U.S. Cl.
CPC ..... *H04N 1/00559* (2013.01); *H04N 1/00602* (2013.01); *H04N 1/00615* (2013.01); *H04N 2201/0081* (2013.01)

(58) Field of Classification Search
CPC ............ B65H 2220/01; B65H 2220/02; B65H 2220/11; B65H 2301/4212; B65H 2301/4213; B65H 2405/1116; B65H 2406/323; B65H 2511/214; B65H 2511/414; B65H 2511/51; B65H 2513/50; B65H 2801/27; B65H 29/32; B65H 29/58; B65H 29/60; B65H 31/10; B65H 31/3081; B65H 2404/113; B65H 2404/117; B65H 27/00; B65H 1/06; B65H 1/266; B65H 1/28; B65H 2301/42322; B65H 2403/422; B65H 2403/722; B65H 2403/732; B65H 2404/63; B65H 2404/692; B65H 3/22; B65H 3/5261; B65H 16/005; B65H 2402/443; B65H 2801/63; B65H 2801/81; B65H 49/08; B65H 49/322; H04N 1/0058; H04N 1/00612; H04N 1/0443; H04N 1/2032; G03G 2221/1657; G03G 15/6538; G03G 15/6541; G03G 15/6552;
(Continued)

(56) References Cited

U.S. PATENT DOCUMENTS 4,931,834 A * 6/1990 Suga ................. G03G 15/757
399/75
5,344,130 A * 9/1994 Suzuki ............. G03G 15/6582
271/189

(Continued)

FOREIGN PATENT DOCUMENTS

JP 2017-224994 A 12/2017

*Primary Examiner* — Negussie Worku
(74) *Attorney, Agent, or Firm* — WORKMAN NYDEGGER

(57) ABSTRACT

An image reading apparatus includes a first unit, a second unit, a motor, and a power transmission mechanism. The second unit is configured to be rotated in relation to the first unit and configured to be closed onto, and opened away from, the first unit by being rotated. The motor is provided in the first unit. The power transmission mechanism transmits motive power of the motor from the first unit to the second unit. The power transmission mechanism includes a first gear and a second gear. The first gear has the same axial center of rotation as that of the second unit. The second gear is provided in the second unit and is in mesh with the first gear.

10 Claims, 15 Drawing Sheets

(58) Field of Classification Search
CPC ..... G03G 15/6582; G03G 2215/00426; G03G 2215/00818; G03G 2215/00827; G03G 2215/00911; G03G 15/757; G03G 21/1647; G03G 15/1615; G03G 21/1857; G03G 2215/0132; G03G 2221/1642; G03G 15/2017; G03G 15/2032; G03G 15/2053; G03G 15/2064; G03G 2215/2038; B65G 13/071; B65G 13/075; B65G 39/02; B65G 39/12; B65G 47/66; B65B 41/12
USPC .......................................................... 358/474
See application file for complete search history.

(56) References Cited

U.S. PATENT DOCUMENTS

| | | | | |
|---|---|---|---|---|
| 5,903,811 | A * | 5/1999 | Kobayashi | H04N 1/00591 399/373 |
| 6,603,950 | B2 * | 8/2003 | Hamada | H04N 1/00551 355/75 |
| 6,640,082 | B2 * | 10/2003 | Mitomi | H04N 1/00588 399/374 |
| 7,131,719 | B2 * | 11/2006 | Takagi | B41J 2/175 347/85 |
| 7,308,871 | B2 * | 12/2007 | Machida | F01L 13/0026 123/90.11 |
| 8,857,854 | B2 * | 10/2014 | Midorikawa | B60R 22/46 280/806 |
| 2002/0067939 | A1 * | 6/2002 | Hamada | H04N 1/00602 399/367 |
| 2012/0198953 | A1 * | 8/2012 | Midorikawa | B60R 22/46 74/335 |
| 2015/0172491 | A1 * | 6/2015 | Lee | B65H 5/06 271/264 |
| 2017/0366696 | A1 | 12/2017 | Koyanagi et al. | |
| 2019/0238698 | A1 * | 8/2019 | Fujiwara | H04N 1/00604 |
| 2020/0039771 | A1 * | 2/2020 | Tajima | B65H 3/0669 |
| 2021/0306492 | A1 * | 9/2021 | Nakashima | H04N 1/00795 |

\* cited by examiner

IMAGE READING APPARATUS

The present application is based on, and claims priority from JP Application Serial Number 2021-160517, filed Sep. 30, 2021, the disclosure of which is hereby incorporated by reference herein in its entirety.

BACKGROUND

1. Technical Field

Embodiments of the present disclosure relate to an image reading apparatus that reads an image of a medium.

2. Related Art

There exist sheet-feed-type scanners as an example of an image reading apparatus. In the description below, when the term "scanner" is simply used, it means a sheet-feed-type scanner. Some scanners include, as disclosed in JP-A-2017-224994, a lower unit and an upper unit that can be closed onto and opened away from the lower unit, and have a structure in which a document transportation path becomes exposed when the upper unit is opened.

A separating roller is provided in the upper unit. Motive power is transmitted from a motor provided in the lower unit to the separating roller. When the upper unit is in a closed state, a transmission gear provided in the upper unit is in mesh with a transmission gear provided in the lower unit, and the motive power is transmitted from the motor to the separating roller. The transmission gear provided in the upper unit and the transmission gear provided in the lower unit become disengaged when the upper unit is opened.

In a structure in which a transmission gear provided in an upper unit and a transmission gear provided in a lower unit come into mesh with and become disengaged from each other as in the above structure, backlash between the transmission gear provided in the upper unit and the transmission gear provided in the lower unit tends to vary. When the value of backlash of the two transmission gears that are in mesh with each other is less than an appropriate value, there is a risk of an increase in the load of the motor or a decrease in the length of gear service life. On the other hand, when the value of backlash of the two transmission gears that are in mesh with each other is greater than an appropriate value, there is a risk of a decrease in roller rotation precision or the occurrence of significant noise or vibrations at the meshing portion of the two transmission gears.

SUMMARY

An image reading apparatus according to a certain aspect of the present disclosure includes: a first unit; a second unit configured to be rotated in relation to the first unit and configured to be closed onto, and opened away from, the first unit by being rotated; a motor provided in the first unit or the second unit; and a power transmission mechanism that transmits motive power of the motor from the first unit to the second unit or from the second unit to the first unit, wherein a document transportation path for transportation of the document is formed when the second unit is closed onto the first unit, and the document transportation path is split open when the second unit is opened away from the first unit, and the power transmission mechanism includes a first gear, which has a same axial center of rotation as that of the second unit, and a second gear, which is provided in the second unit and is in mesh with the first gear.

DESCRIPTION OF EXEMPLARY EMBODIMENTS

Figure 1:
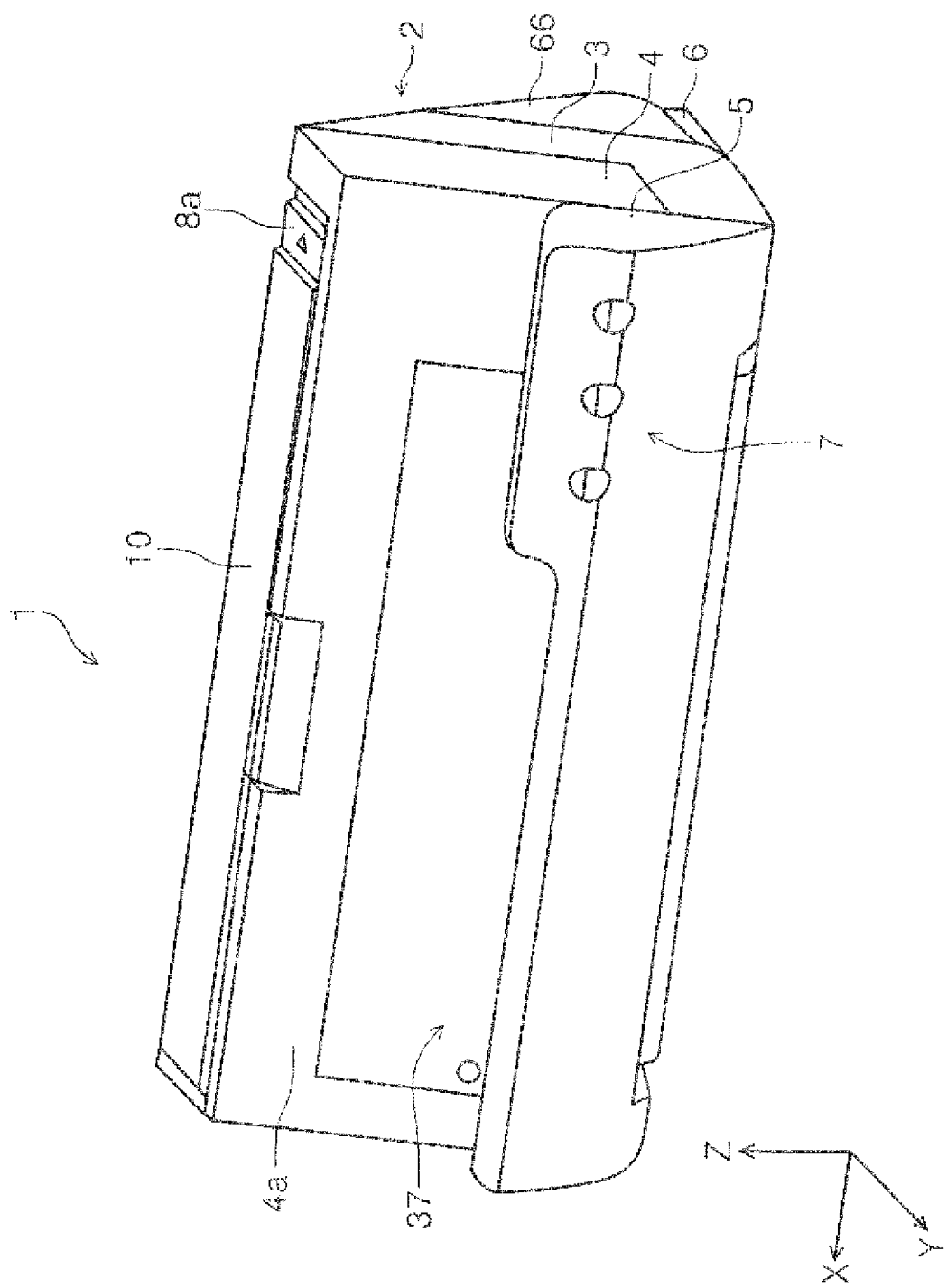
FIG. 1 is a front perspective view of a scanner viewed when an apparatus body is in ordinary reading position.

First, a brief overview of the present disclosure is presented below.

An image reading apparatus according to a first exemplary embodiment includes: a first unit; a second unit configured to be rotated in relation to the first unit and configured to be closed onto, and opened away from, the first unit by being rotated; a motor provided in the first unit or the second unit; and a power transmission mechanism that transmits motive power of the motor from the first unit to the second unit or from the second unit to the first unit, wherein a document transportation path for transportation of the document is formed when the second unit is closed onto the first unit, and the document transportation path is split open when the second unit is opened away from the first unit, and the power transmission mechanism includes a first gear, which has a same axial center of rotation as that of the second unit, and a second gear, which is provided in the second unit and is in mesh with the first gear.

In this exemplary embodiment, since the power transmission mechanism, which transmits motive power of the motor from the first unit to the second unit or from the second unit to the first unit, includes the first gear, which has the same axial center of rotation as that of the second unit, and the second gear, which is provided in the second unit and is in mesh with the first gear, the second gear remains in mesh with the first gear though the second gear moves around the first gear by sun-and-planet motion when the second unit is opened. With this structure, it is possible to keep an appropriate backlash in the meshing of the first gear and the second gear and thus prevent a problem arising from a change in the backlash.

In a second exemplary embodiment, the image reading apparatus according to the first exemplary embodiment further includes: a pair of first transporting rollers; and a pair of second transporting rollers, wherein the reading portion includes a first reading portion, which is provided in the first unit and reads the image of the document transported along the document transportation path, and a second reading portion, which is provided in the second unit and reads the image of the document transported along the document transportation path, the pair of first transporting rollers is located upstream of the first reading portion and the second reading portion on the document transportation path, the pair of second transporting rollers is located downstream of the first reading portion and the second reading portion on the document transportation path, the pair of first transporting rollers includes a first lower roller, with which a lower surface of the document that is being transported along the document transportation path comes into contact in the first unit, and a first upper roller, with which an upper surface of the document that is being transported along the document transportation path comes into contact in the second unit, the pair of second transporting rollers includes a second lower roller, with which the lower surface of the document comes into contact in the first unit, and a second upper roller, with which the upper surface of the document comes into contact in the second unit, and the motor drives the first lower roller, the first upper roller, the second lower roller, and the second upper roller via the power transmission mechanism.

In this exemplary embodiment, since all of the first lower roller, the first upper roller, the second lower roller, and the second upper roller are driven by the motor, it is possible to transport a thick document reliably.

A third exemplary embodiment is that, in the second exemplary embodiment, the first upper roller is configured to be advanced toward, and be moved back from, the first lower roller, and is pushed toward the first lower roller, the second upper roller is configured to be advanced toward, and be moved back from, the second lower roller, and is pushed toward the second lower roller, and a direction in which the first gear rotates when the document is transported by the pair of first transporting rollers and the pair of second transporting rollers is a direction in which the first gear applies, to the second gear, a force in a direction of opening the second unit.

The first upper roller is configured to be advanced toward, and be moved back from, the first lower roller, and is pushed toward the first lower roller, and the second upper roller is configured to be advanced toward, and be moved back from, the second lower roller, and is pushed toward the second lower roller; because of this structure, the second unit, which includes the first upper roller and the second upper roller, receives a force in an opening direction from the first unit when in a closed state. This force will be hereinafter referred to as "a first force".

In this exemplary embodiment, a direction in which the first gear rotates when the document is transported by the pair of first transporting rollers and the pair of second transporting rollers is a direction in which the first gear applies, to the second gear, a force in a direction of opening the second unit. This force will be hereinafter referred to as "a second force".

Since both of the first force and the second force act in the direction of opening the second unit, the amount of backlash between the first gear and the second gear will be more stable than in a structure in which the direction in which the first force acts on the second unit and the direction in which the second force acts on the second unit are the opposite of each other.

In a fourth exemplary embodiment, the image reading apparatus according to the second exemplary embodiment or the third exemplary embodiment further includes: a third unit configured to be rotated in relation to the first unit and the second unit and configured to be closed onto, and opened away from, the first unit and the second unit by being rotated, an axial center of rotation of the third unit is the same as that of the second unit, and the power transmission mechanism includes a third gear that is provided in the third unit and is in mesh with the first gear.

In this exemplary embodiment, since the power transmission mechanism includes the third gear that is provided in the third unit and is in mesh with the first gear, the third gear remains in mesh with the first gear though the third gear moves around the first gear by sun-and-planet motion when the third unit is opened. With this structure, it is possible to keep an appropriate backlash in the meshing of the first gear and the third gear and thus prevent a problem arising from a change in the backlash.

In a fifth exemplary embodiment, the image reading apparatus according to the fourth exemplary embodiment further includes: a turning-over transportation path that is a document transportation path located downstream of a reading transportation path and is used when the read document is turned over and is ejected upward, wherein the reading transportation path is defined as a document transportation path between the pair of first transporting rollers and the pair of second transporting rollers; a non-turning-over transportation path that is a document transportation path located downstream of the reading transportation path and is used when the read document is ejected without being turned over; a transportation path switcher that switches, to either one of the turning-over transportation path and the non-turning-over transportation path, the document transportation path that is to be coupled to the reading transportation path; a pair of third transporting rollers that is provided on the turning-over transportation path and is located downstream of the pair of second transporting rollers; a pair of fourth transporting rollers that is provided on the turning-over transportation path and is located downstream of the pair of third transporting rollers; the turning-over transportation path is formed between the second unit and the third unit, the pair of third transporting rollers includes a third driving roller, with which the lower surface of the document comes into contact in the third unit and which is driven by the motor, and a third driven roller, with which the upper surface of the document comes into contact in the second unit and which rotates passively by being driven via the document in contact, and the pair of fourth transporting rollers includes a fourth driving roller, with which the lower surface of the document comes into contact in the third unit and which is driven by the motor, and a fourth driven roller, with which the upper surface of the document comes into contact in the second unit and which rotates passively by being driven via the document in contact.

Since switching can be performed between the turning-over transportation path and the non-turning-over transportation path, the image reading apparatus according to this exemplary embodiment is able to transport a document that is less pliable well by using the non-turning-over transportation path.

A sixth exemplary embodiment is that, in the fifth exemplary embodiment, the third driven roller is configured to be advanced toward, and be moved back from, the third driving roller, and is pushed toward the third driving roller, the fourth driven roller is configured to be advanced toward, and be moved back from, the fourth driving roller, and is pushed toward the fourth driving roller, and a direction in which the first gear rotates when the document is transported by the pair of third transporting rollers and the pair of fourth transporting rollers is a direction in which the first gear applies, to the third gear, a force in a direction of opening the third unit.

The third driven roller is configured to be advanced toward, and be moved back from, the third driving roller, and is pushed toward the third driving roller, and the fourth driven roller is configured to be advanced toward, and be moved back from, the fourth driving roller, and is pushed toward the fourth driving roller; because of this structure, the third unit receives a force in an opening direction from the second unit when in a closed state. This force will be hereinafter referred to as "a third force".

In this exemplary embodiment, a direction in which the first gear rotates when the document is transported by the pair of third transporting rollers and the pair of fourth transporting rollers is a direction in which the first gear applies, to the third gear, a force in a direction of opening the third unit. This force will be hereinafter referred to as "a fourth force".

Since both of the third force and the fourth force act in the direction of opening the third unit, the amount of backlash between the first gear and the third gear will be more stable than in a structure in which the direction in which the third force acts on the third unit and the direction in which the fourth force acts on the third unit are the opposite of each other.

A seventh exemplary embodiment is that, in the fifth exemplary embodiment or the sixth exemplary embodiment, a plurality of gears that are included in the power transmission mechanism and are provided in the first unit are arranged along the reading transportation path at a side face of a first frame constituting a base body of the first unit, and a plurality of gears that are included in the power transmission mechanism and are provided in the second unit are arranged along the reading transportation path at a side face of a second frame constituting a base body of the second unit. Therefore, it is possible to prevent an increase in size of the apparatus.

An eighth exemplary embodiment is that, in the second exemplary embodiment, the first upper roller is configured to be advanced toward, and be moved back from, the first lower roller, and is pushed toward the first lower roller, the second upper roller is configured to be advanced toward, and be moved back from, the second lower roller, and is pushed toward the second lower roller, and the motive power of the motor is transmitted to the first upper roller and the second upper roller via a universal joint.

In this exemplary embodiment, since the motive power of the motor is transmitted to the first upper roller and the second upper roller, which are movable, via the universal joint, it is possible to properly transmit the motive power of the motor to the first upper roller and the second upper roller, which are movable.

Next, embodiments of the present disclosure will now be explained with specific examples.

In the description below, a scanner 1 configured to read either one or both of a first side and a second side, which is the opposite of the first side, of a document is taken as an example of an image reading apparatus. The scanner 1 is a so-called sheet-feed-type scanner that performs reading while moving a document with respect to a reading portion that will be described later.

The term "document" as used in this specification encompasses not only a sheet-type original but also a card-type original and a booklet-type original.

In the X-Y-Z coordinate system depicted in each figure, the X-axis direction represents the width direction of the apparatus, meaning the width direction of a document. The Y-axis direction represents the depth direction of the apparatus. The Z-axis direction is along the vertical direction.

In the present embodiment, the direction from the rear toward the front of the apparatus is defined as the +Y direction, and the direction from the front toward the rear of the apparatus is defined as the −Y direction. Facing the front of the apparatus, the direction toward the left is defined as the +X direction, and the direction toward the right is defined as the −X direction.

In the description below, the direction in which a document is transported may be described as "downstream", and the opposite direction may be described as "upstream".

Figure 2:
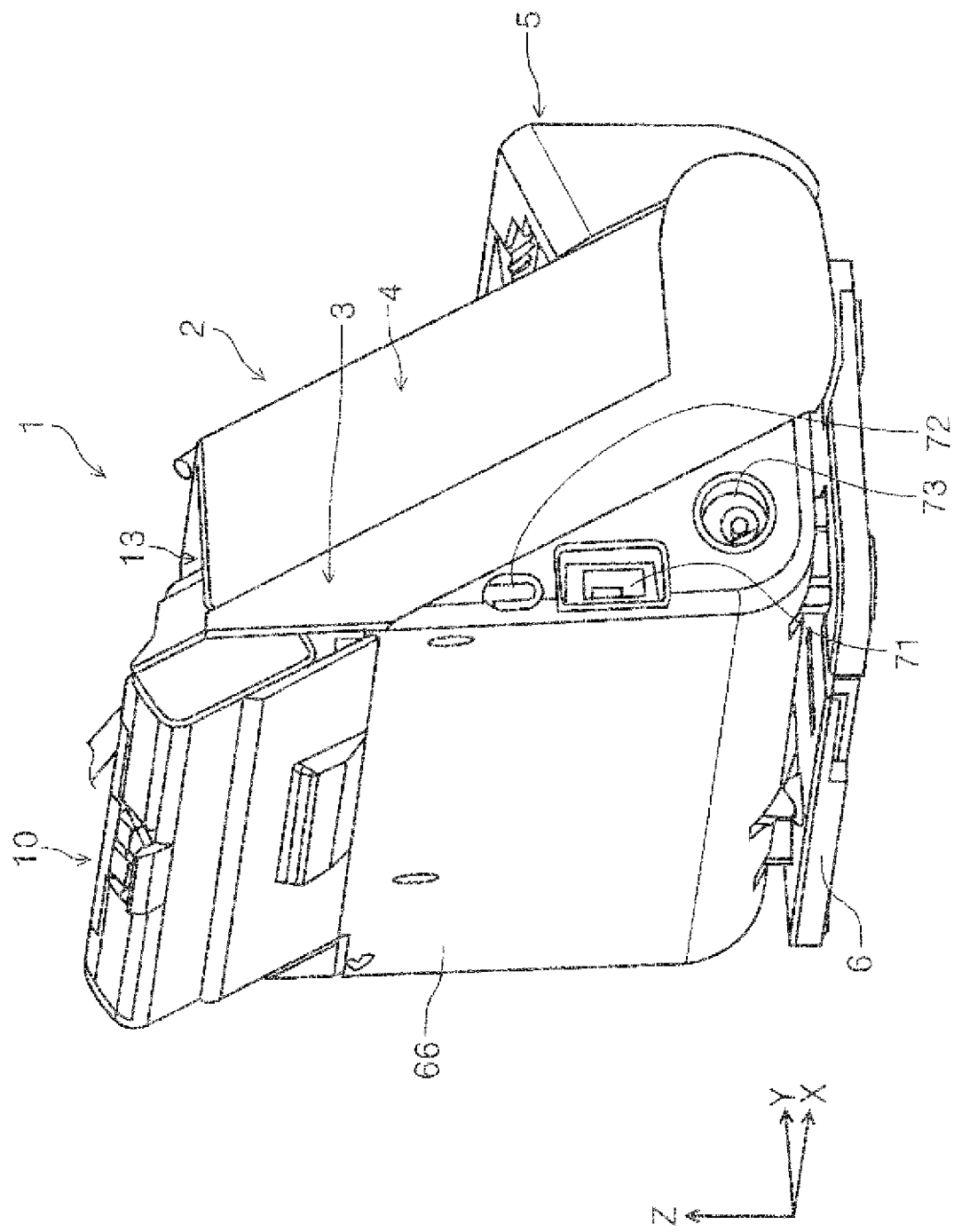
FIG. 2 is a rear perspective view of the scanner viewed when the apparatus body is in the ordinary reading position.

In FIGS. 1 and 2, the scanner 1 includes an apparatus body 2 and a body supporting table 6. The body supporting table 6 supports the apparatus body 2 rotatably.

The apparatus body 2 includes a first unit 3, a second unit 4, and a third unit 5.

Figure 3:
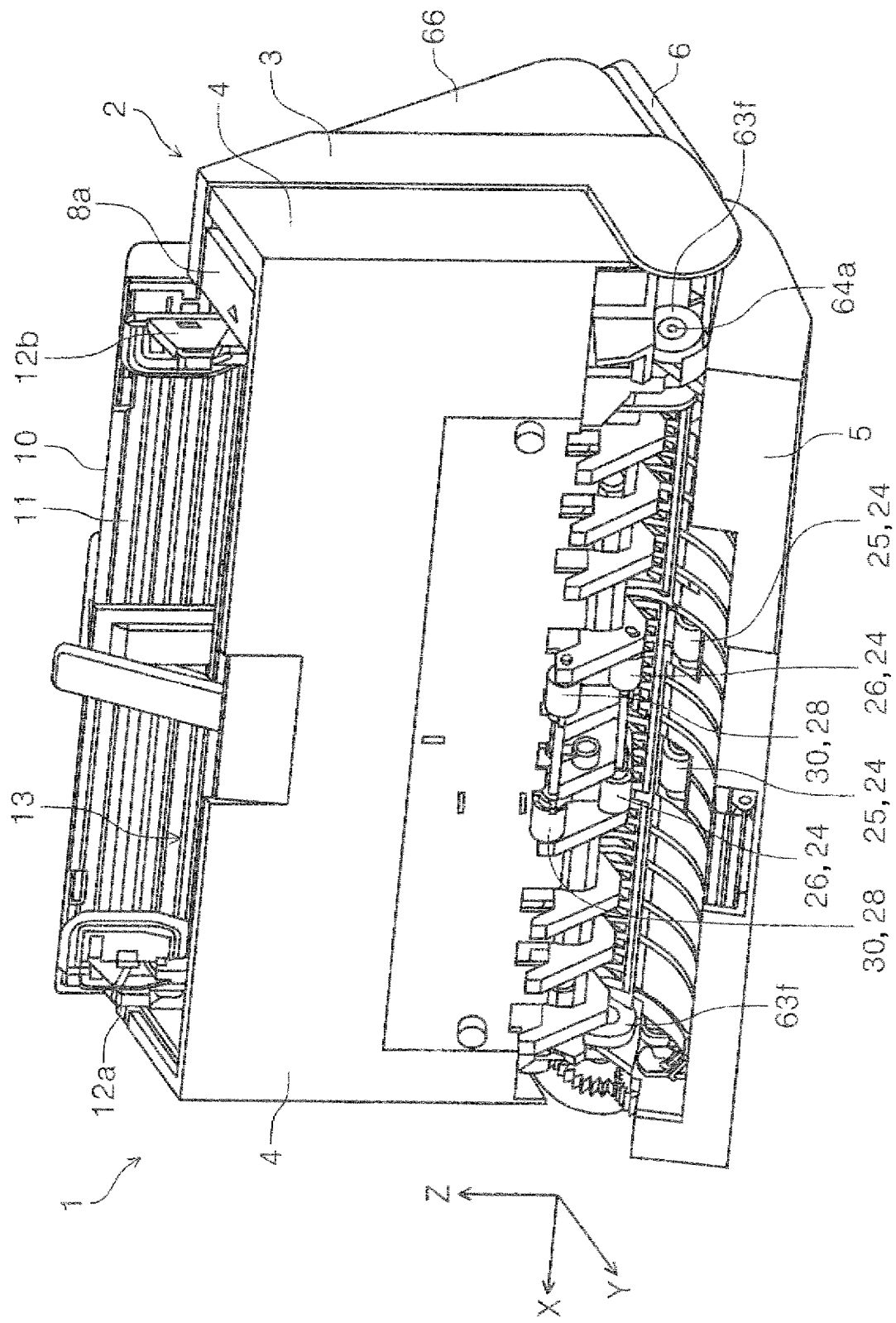
FIG. 3 is a front perspective view of the scanner viewed when the apparatus body is in the ordinary reading position, with a third unit opened.

The second unit 4 and the third unit 5 are rotatable on a frame rotation shaft 64a (see FIG. 3). The frame rotation shaft 64a is a rotation shaft having its axial center of rotation in parallel with the X axis.

Figure 4:
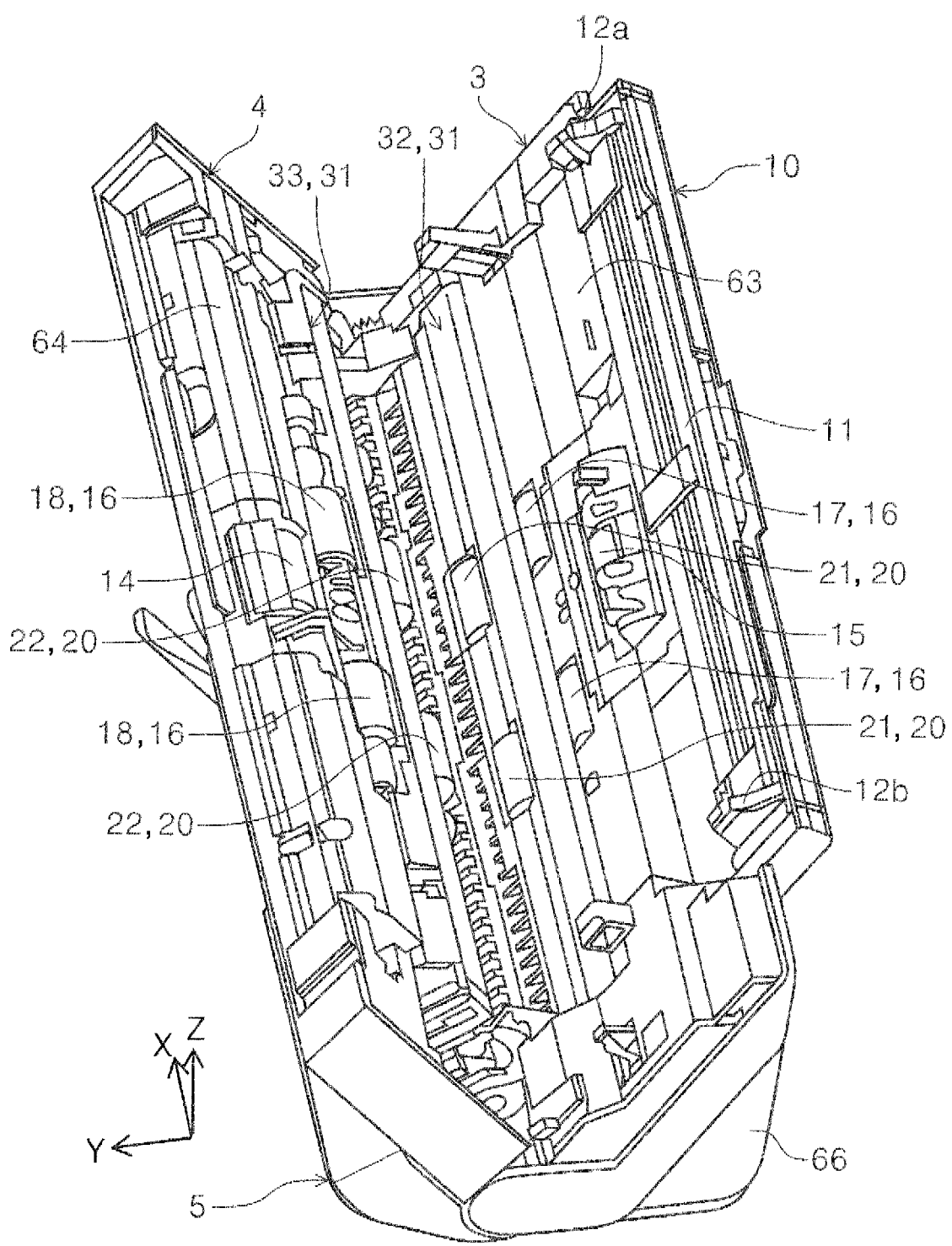
FIG. 4 is a top perspective view of the scanner viewed when the apparatus body is in the ordinary reading position, with a second unit opened.

The second unit 4 and the third unit 5 are able to be rotated together on the frame rotation shaft 64a in relation to the first unit 3 (see FIG. 4). By rotating the second unit 4 and the third unit 5 in relation to the first unit 3, it is possible to make a part of a document transportation path exposed as illustrated in FIG. 4. More particularly, it is possible to make a document feeding path R1 and a reading transportation path R2, which will be described later, exposed.

In addition, the third unit 5 is able to be rotated on the frame rotation shaft 64a in relation to the first unit 3 and the second unit 4 (see FIG. 3). By rotating the third unit 5 in relation to the first unit 3 and the second unit 4, it is possible to make a part of the document transportation path exposed as illustrated in FIG. 3. More particularly, it is possible to make a turning-over transportation path R3, which will be described later, exposed.

Figure 5:
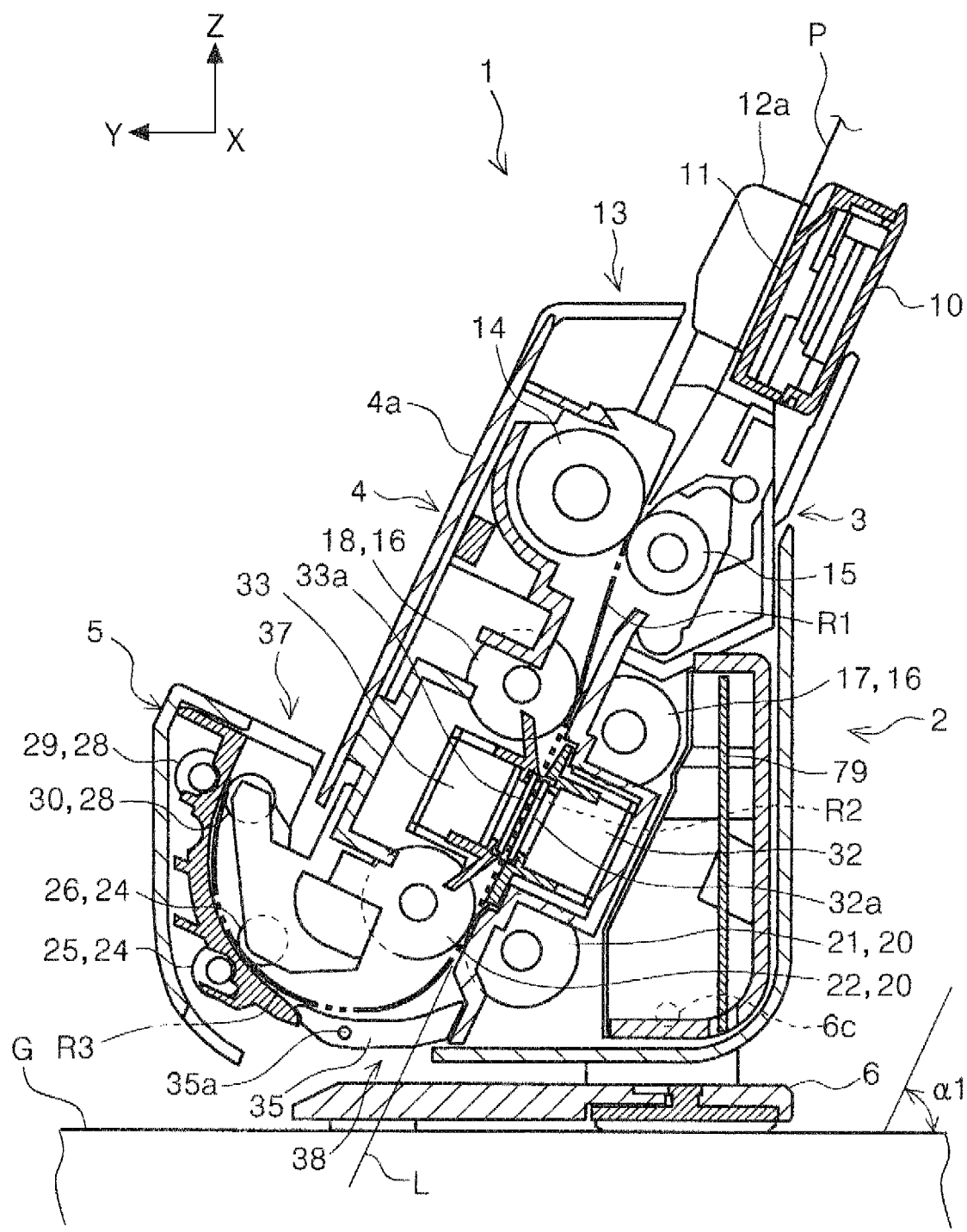
FIG. 5 is a cross-sectional view of a document transportation path of the scanner, viewed in a width direction, when the apparatus body is in the ordinary reading position.
Figure 6:
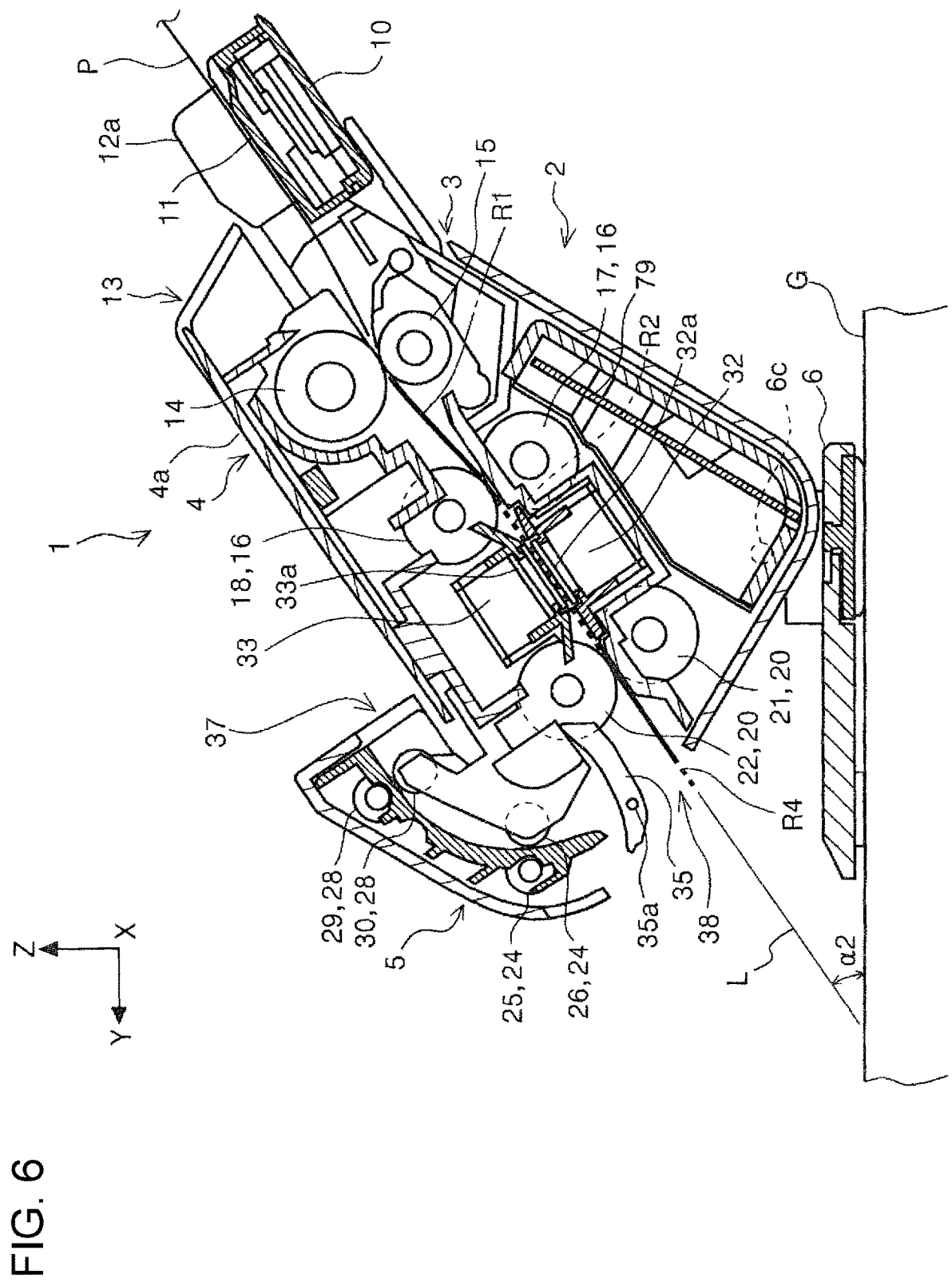
FIG. 6 is a cross-sectional view of a document transportation path of the scanner, viewed in the width direction, when the apparatus body is in booklet reading position.

The apparatus body 2 is able to be rotated on a body rotation shaft 6c (see FIGS. 5 and 6) in relation to the body supporting table 6. In the present embodiment, the apparatus body 2 can be held with switching between two positional orientations by being rotated. These two positions of the apparatus body 2 is illustrated in FIGS. 5 and 6. In the description below, the position illustrated in FIG. 5 will be referred to as "ordinary reading position", and the position illustrated in FIG. 6 will be referred to as "booklet reading position". The ordinary reading position is an example of a first position of the apparatus body 2. The booklet reading position is an example of a second position of the apparatus body 2.

Each of the angle $\alpha 1$ illustrated in FIG. 5 and the angle $\alpha 2$ illustrated in FIG. 6 is an angle formed by the reading transportation path R2, which will be described later, and the apparatus-installed plane G. The angle $\alpha 2$ for a case where the apparatus body 2 is in the booklet reading position is smaller than the angle $\alpha 1$ for a case where the apparatus body 2 is in the ordinary reading position.

The projection area size of the apparatus body 2 projected onto the plane G, on which the scanner 1 is installed, is smallest when the apparatus body 2 is in the ordinary reading position. That is, the ordinary reading position is a positional orientation in which the apparatus body 2 has the smallest footprint.

The term "footprint" as used in this specification means the area occupied by the apparatus body 2 on the X-Y plane when the apparatus body 2 is viewed from above.

The ordinary reading position is suitable for reading a sheet-type document, namely, a sheet having low stiffness and is therefore easily pliable. The booklet reading position is suitable for reading a sheet having high stiffness and is therefore not easily pliable, for example, a plastic card, a booklet, or the like.

In the present embodiment, the positional switching and positional holding of the apparatus body 2 is performed using the power of a motor that is not illustrated. However, the positional switching of the apparatus body 2 may be performed by the user's manually applying a force to the apparatus body 2.

In FIG. 1, an operation portion 7 comprised of a plurality of operation buttons including a power button is provided on the front of the apparatus.

A first connection portion 71, a second connection portion 72, and a third connection portion 73 are provided on the +X-directional one of the side surfaces of the apparatus constituting the enclosure of the apparatus as illustrated in FIG. 2. The first connection portion 71 is a connection portion to which a USB Type-A plug (not illustrated) is to be connected. The second connection portion 72 is a connection portion to which a USB Type-C plug (not illustrated) is to be connected. The third connection portion 73 is a connection portion to which a power plug (not illustrated) for supplying power to the apparatus body 2 is to be connected.

USB is an acronym for Universal Serial Bus, and each of Type-A and Type-C is one of a plurality of types stipulated in the USB standard.

An external device can be connected to the first connection portion 71 via a USB cable (not illustrated). Besides an external device, a storage medium, for example, a USB memory (not illustrated), can be connected to the first connection portion 71. A controller (not illustrated) of the scanner 1 is able to store read data into the storage medium connected to the first connection portion 71.

An external device can be connected to the second connection portion 72 via a USB cable (not illustrated).

The first connection portion 71, the second connection portion 72, and the third connection portion 73 are provided on a circuit board (not illustrated) located in the rear of the apparatus.

In the present embodiment, the apparatus body 2 is able to receive power supply from the external device connected to the second connection portion 72.

Next, with reference to FIGS. 5 and 6, the structure of a document transportation path in the scanner 1 will now be explained. A document to be fed is supported in an inclined position by a document supporting portion 11. The reference alphabet P denotes the document supported thereon. When plural sheets of a document are supported by the document supporting portion 11, the top one of these sheets is fed downstream by a feeding roller 14. The document supporting portion 11 is formed in a top opening/closing portion 10. The top opening/closing portion 10 is rotatable on a rotation shaft that is not illustrated. By being rotated, the top opening/closing portion 10 opens and closes a feeding port 13. A state in which the top opening/closing portion 10 is closed is illustrated in FIG. 1. A state in which the top opening/closing portion 10 is open is illustrated in FIG. 2. The top opening/closing portion 10 is a component of the first unit 3.

As illustrated in FIG. 3, a pair of edge guides 12*a* and 12*b* for guiding the side edges of a document is provided on the document supporting portion 11. These edge guides 12*a* and 12*b* constituting a pair are able to slide in a document width direction (X-axis direction). These edge guides 12*a* and 12*b* constituting a pair are provided such that they are mutually linked and thus can be moved closer to each other or away from each other together by a rack-and-pinion mechanism that is not illustrated, with the center in the document width direction located therebetween. That is, a so-called center feeding method is used in the scanner 1.

Referring back to FIGS. 5 and 6, the feeding roller 14 is provided in the second unit 4. The feeding roller 14 rotates by receiving power from a transporting motor 50, which will be described later. A separating roller 15 is provided in the first unit 3 at a position where it faces the feeding roller 14. A rotation torque is applied to the separating roller 15 by a torque limiter that is not illustrated. The separating roller 15 prevents multiple sheet feeding from occurring.

The feeding roller 14 and the separating roller 15 are provided at the center in the document width direction (see FIG. 4).

A separating pad may be provided in place of the separating roller 15.

In the present embodiment, the feeding roller 14 is provided over sheets of a document stacked on the document supporting portion 11, and these sheets are fed sequentially, starting from the top one thereof. However, the feeding roller 14 may be provided under sheets of a document stacked on the document supporting portion 11, and these sheets may be fed sequentially, starting from the bottom one thereof.

A pair of first transporting rollers 16 is provided downstream of the feeding roller 14 and the separating roller 15. The pair of first transporting rollers 16 is made up of first lower rollers 17, which are provided in the first unit 3, and first upper rollers 18, which are provided in the second unit 4. The first upper roller 18 is able to be advanced toward, and be moved back from, the first lower roller 17. The first upper roller 18 is pushed toward the first lower roller 17 by a pushing member that is not illustrated, for example, a coil spring.

Both the first lower roller 17 and the first upper roller 18 are configured to rotate by receiving power from the transporting motor 50, which will be described later. There are two first lower rollers 17, with the center in the document width direction located therebetween, and there are two first upper rollers 18, with the center in the document width direction located therebetween (see FIG. 4).

The first upper rollers 18 come into contact with the first lower rollers 17 when the second unit 4 is closed onto the first unit 3. The first upper rollers 18 are separated from the first lower rollers 17 when the second unit 4 is opened away from the first unit 3.

A first reading portion 32 and a second reading portion 33 are provided downstream of the pair of first transporting rollers 16. The first reading portion 32 and the second reading portion 33 are arranged such that they face each other. The first reading portion 32 is provided in the first unit 3. The second reading portion 33 is provided in the second unit 4. The first reading portion 32 reads the lower surface (first side) of a document supported on the document supporting portion 11, and the second reading portion 33 reads the upper surface (second side) of the document supported on the document supporting portion 11. The second reading portion 33 is able to be advanced toward, and be moved back from, the first reading portion 32. The second reading portion 33 is pushed toward the first reading portion 32 by a pushing member that is not illustrated, for example, a coil spring.

In the present embodiment, the first reading portion 32 and the second reading portion 33 are contact-type image sensor modules (CISM). The reference numeral 32a denotes a contact glass that is a component of the first reading portion 32. The reference numeral 33a denotes a contact glass that is a component of the second reading portion 33.

A pair of second transporting rollers 20 is provided downstream of the first reading portion 32 and the second reading portion 33. The pair of second transporting rollers 20 is made up of second lower rollers 21, which are provided in the first unit 3, and second upper rollers 22, which are provided in the second unit 4. The second upper roller 22 is able to be advanced toward, and be moved back from, the second lower roller 21. The second upper roller 22 is pushed toward the second lower roller 21 by a pushing member that is not illustrated, for example, a coil spring.

Both the second lower roller 21 and the second upper roller 22 are configured to rotate by receiving power from the transporting motor 50, which will be described later. There are two second lower rollers 21, with the center in the document width direction located therebetween, and there are two second upper rollers 22, with the center in the document width direction located therebetween (see FIG. 4).

The second upper rollers 22 come into contact with the second lower rollers 21 when the second unit 4 is closed onto the first unit 3. The second upper rollers 22 are separated from the second lower rollers 21 when the second unit 4 is opened away from the first unit 3.

In FIGS. 5 and 6, a path denoted as a reference sign R1 and indicated by a dot-and-dash line is a document feeding path. The document feeding path R1 leads from a nip position between the feeding roller 14 and the separating roller 15 to a nip position of the pair of first transporting rollers 16. In FIGS. 5 and 6, a path denoted as a reference sign R2 and indicated by a broken line is a reading transportation path. The reading transportation path R2 leads from the nip position of the pair of first transporting rollers 16 to a nip position of the pair of second transporting rollers 20. The reading transportation path R2 is a document transportation path where the document is to face the first reading portion 32 and the second reading portion 33.

When the apparatus body 2 is in the ordinary reading position illustrated in FIG. 5, a turning-over transportation path R3 is formed downstream of the reading transportation path R2. The turning-over transportation path R3 is a path used when the sheet of the document having been read is turned over and is ejected upward. The turning-over transportation path R3 is a document transportation path located downstream of the nip position of the pair of second transporting rollers 20. As indicated by a dot-dot-dash curve in FIG. 5, the document transported obliquely downward is then turned over while moving along the curve of the turning-over transportation path R3, and is finally ejected obliquely upward from a first ejection port 37.

When the apparatus body 2 is in the booklet reading position illustrated in FIG. 6, a non-turning-over transportation path R4 is formed downstream of the reading transportation path R2. The non-turning-over transportation path R4 is a path used when the document having been read is ejected without being turned over. The non-turning-over transportation path R4 is a document transportation path located downstream of the nip position of the pair of second transporting rollers 20. As indicated by a dot-dot-dash line in FIG. 6, the document transported obliquely downward along the reading transportation path R2 then moves linearly along the non-turning-over transportation path R4, and is finally ejected obliquely downward from a second ejection port 38 without being turned over.

The pair of second transporting rollers 20 in this case functions as a pair of ejecting rollers that eject the document out of the non-turning-over transportation path R4.

Switching between the turning-over transportation path R3 and the non-turning-over transportation path R4 is performed by a flap 35. The flap 35 is a member that is an example of a transportation path switcher. The flap 35 is able to turn around a flap rotation shaft 35a. By turning around the flap rotation shaft 35a, the flap 35 makes the turning-over transportation path R3 coupled to the reading transportation path R2 or makes the non-turning-over transportation path R4 coupled to the reading transportation path R2. Coupling the turning-over transportation path R3 to the reading transportation path R2 means making the turning-over transportation path R3 available for use and making the non-turning-over transportation path R4 not available for use. Similarly, coupling the non-turning-over transportation path R4 to the reading transportation path R2 means making the non-turning-over transportation path R4 available for use and making the turning-over transportation path R3 not available for use.

In the present embodiment, the turning of the flap 35 is linked with the positional switching of the apparatus body 2. As a component that causes the flap 35 to turn in link with the positional switching of the apparatus body 2, in the present embodiment, a solenoid that is not illustrated is used. Based on a detection signal outputted from a position detection sensor (not illustrated), a controller (not illustrated) configured to perform various kinds of control detects the positional orientation of the apparatus body 2. Based on the detected apparatus-body position, the controller drives the solenoid to cause the flap 35 to turn. The means for causing the flap 35 to turn is not limited to the solenoid. Any other actuator such as a motor may be used instead. Alternatively, the flap 35 may be configured to turn by being mechanically linked with the positional orientation of the apparatus body 2.

A pair of third transporting rollers 24 and a pair of fourth transporting rollers 28 are provided on the turning-over transportation path R3.

The pair of third transporting rollers 24 is made up of third driving rollers 25, which are provided in the third unit 5, and third driven rollers 26, which are provided in the second unit 4. The third driven roller 26 is able to be advanced toward, and be moved back from, the third driving roller 25. The third driven roller 26 is pushed toward the third driving roller 25 by a pushing member that is not illustrated, for example, a coil spring. The third driving roller 25 is driven by the transporting motor 50. The third driven roller 26 is a roller that rotates passively as a follower.

The pair of fourth transporting rollers 28 is made up of fourth driving rollers 29, which are provided in the third unit 5, and fourth driven rollers 30, which are provided in the second unit 4. The fourth driven roller 30 is able to be advanced toward, and be moved back from, the fourth driving roller 29. The fourth driven roller 26 is pushed toward the fourth driving roller 29 by a pushing member that is not illustrated, for example, a coil spring. The fourth driving roller 29 is driven by the transporting motor 50. The fourth driven roller 30 is a roller that rotates passively as a follower.

There are two third driving rollers 25, two third driven rollers 26, two fourth driving rollers 29, and two fourth driven rollers 30, with the center in the document width direction located between the two respectively (see FIG. 3).

The third driving rollers 25 come into contact with the third driven rollers 26 when the third unit 5 is closed onto the second unit 4. The fourth driving rollers 29 come into contact with the fourth driven rollers 30 when the third unit 5 is closed onto the second unit 4. The third driving rollers 25 are separated from the third driven rollers 26 when the third unit 5 is opened away from the second unit 4. The fourth driving rollers 29 are separated from the fourth driven rollers 30 when the third unit 5 is opened away from the second unit 4.

The document having been transported along the turning-over transportation path R3 is ejected obliquely upward, that is, in a direction including a −Y directional component, by the pair of fourth transporting rollers 28 and is then supported in an inclined position by the upper surface 4a of the second unit 4.

Next, a structure for realizing the relative rotation of the first unit 3, the second unit 4, and the third unit 5 will now be explained.

As illustrated in FIG. 2, the frame rotation shaft 64a protruding in the X-axis direction is provided integrally on a second frame 64 constituting the base body of the second unit 4. As the frame rotation shaft 64a, two shaft protrusions are provided at a distance from each other in the X-axis direction.

Figure 10:
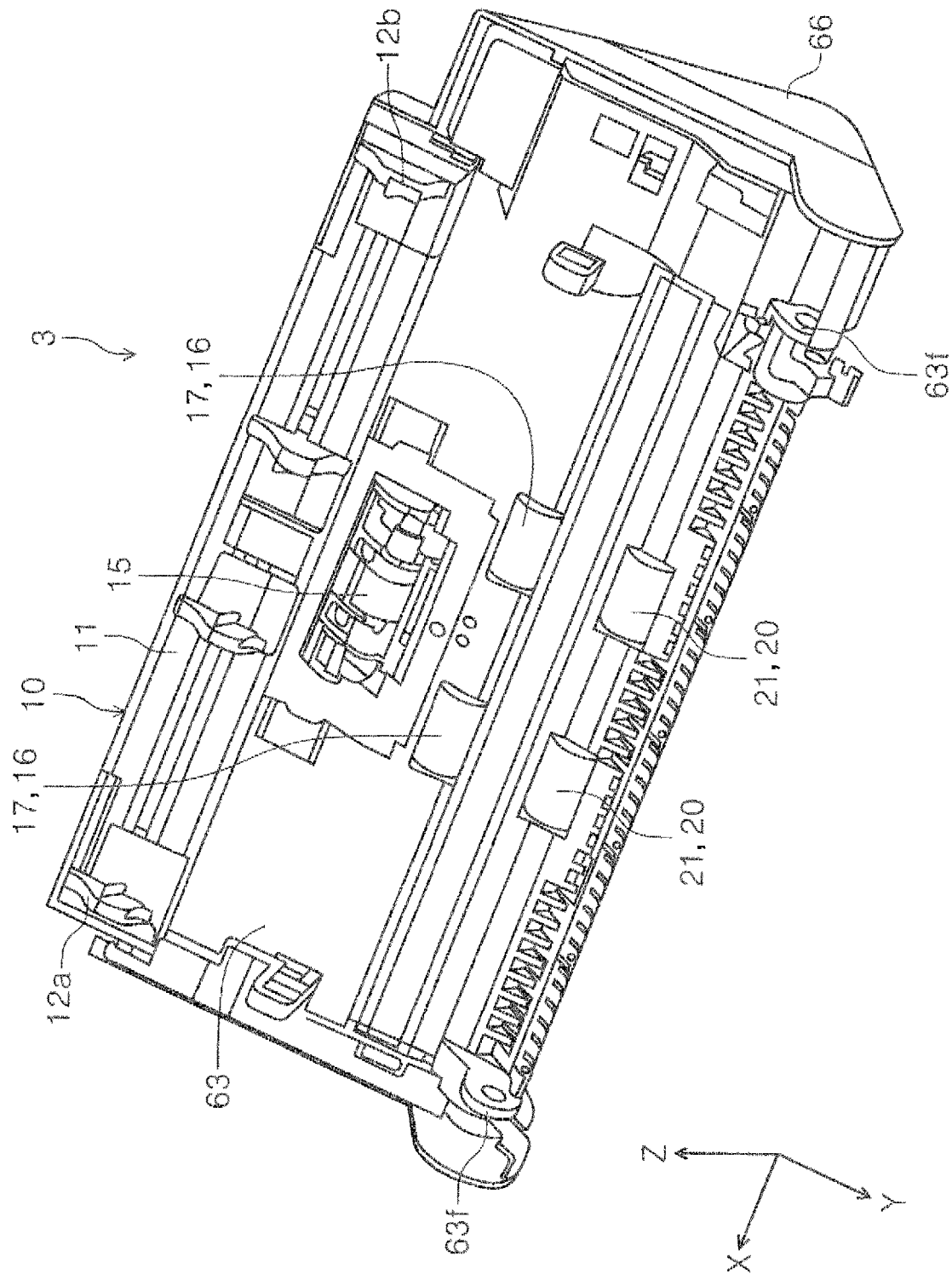
FIG. 10 is a perspective view of a first unit.

As illustrated in FIG. 10, a bearing portion 63f is provided integrally on a first frame 63 constituting the base body of the first unit 3. As the bearing portion 63f, two shaft receptacles are provided at a distance from each other in the X-axis direction. Mating engagement of the frame rotation shaft 64a of the second frame 64 with the bearing portion 63f enables the second frame 64, namely, the second unit 4, to rotate in relation to the first frame 63, namely, the first unit 3.

Figure 11:
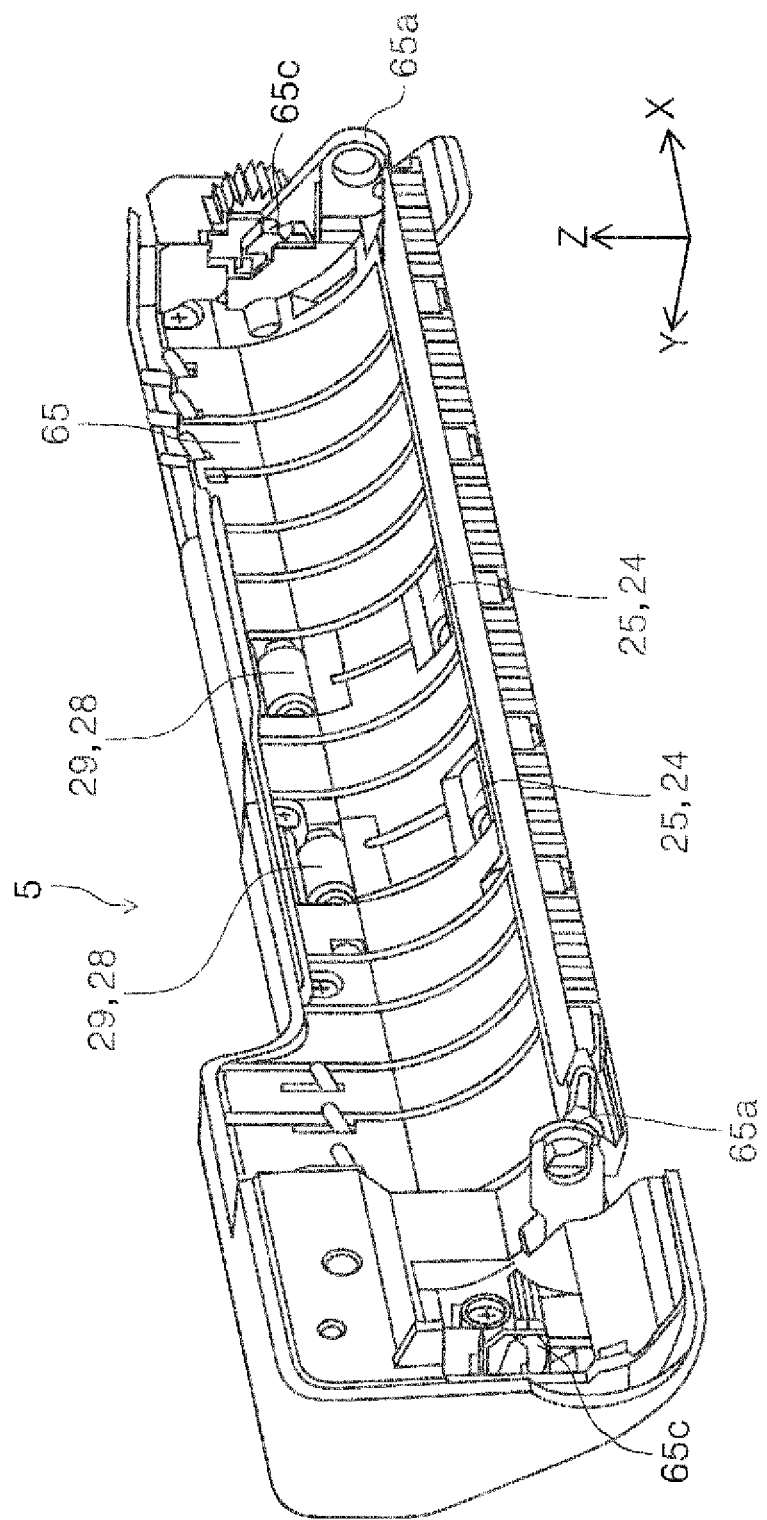
FIG. 11 is a perspective view of the third unit.

As illustrated in FIG. 11, a bearing portion 65a is provided integrally on a third frame 65 constituting the base body of the third unit 5. As the bearing portion 65a, two shaft receptacles are provided at a distance from each other in the X-axis direction. Mating engagement of the frame rotation shaft 64a of the second frame 64 with the bearing portion 65a enables the third frame 65, namely, the third unit 5, to rotate in relation to the first unit 3 and the second unit 4.

The third unit 5 can be opened and closed by being rotated in relation to the second unit 4 that is in a closed state with respect to the first unit 3. In addition, the third unit 5 can be opened and closed by being rotated in relation to the second unit 4 that is in an open state with respect to the first unit 3.

Two locks, as a lock portion 65c, are provided on the third frame 65 at a distance from each other in the X-axis direction. The lock portion 65c is configured to be elastically engaged with a non-illustrated engagement portion formed on the second frame 64. The elastic engagement locks the third frame 65 onto the second frame 64.

Figure 7:
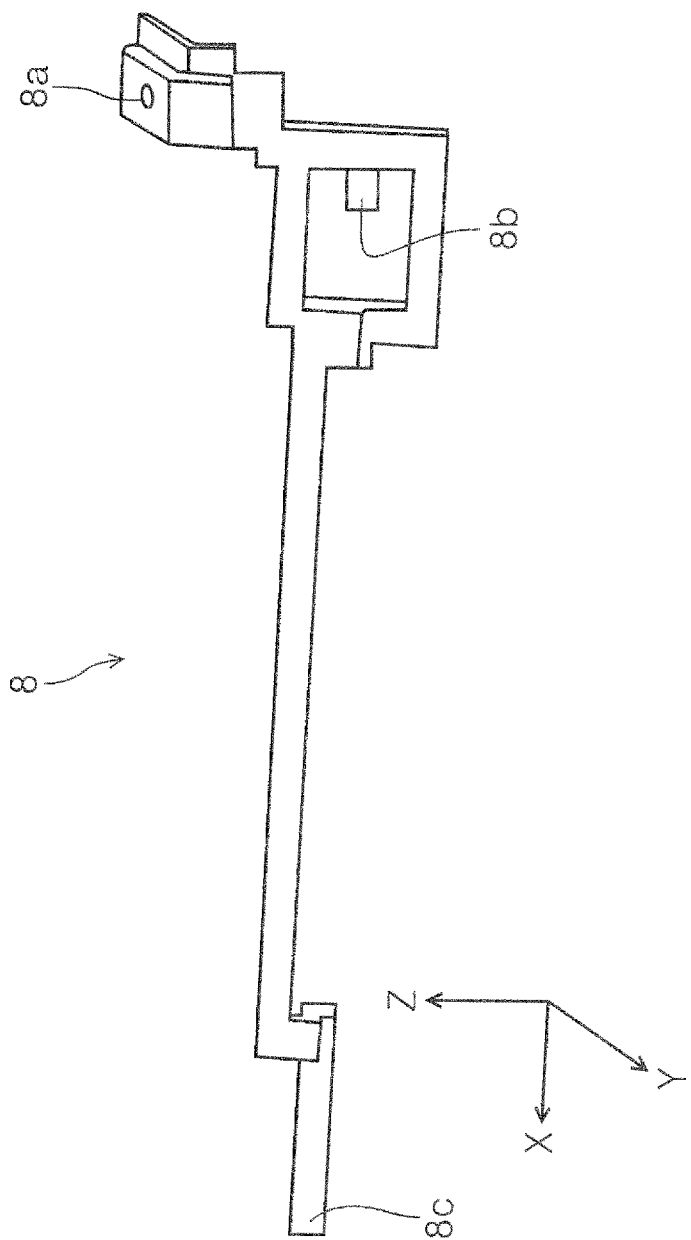
FIG. 7 is a perspective view of a lock member.

Next, a lock member 8 illustrated in FIG. 7 is provided such that it can slide in the X-axis direction on the second frame 64 of the second unit 4. The lock member 8 is urged in the +X direction by a non-illustrated spring on the second frame 64.

The lock member 8 includes an unlocking portion 8a. As illustrated in FIGS. 1 and 3, the unlocking portion 8a is exposed at the top of the second unit 4. By sliding the unlocking portion 8a in the −X direction, the user is able to unlock the second unit 4 from the first unit 3 and then to open the second unit 4.

Figure 8:
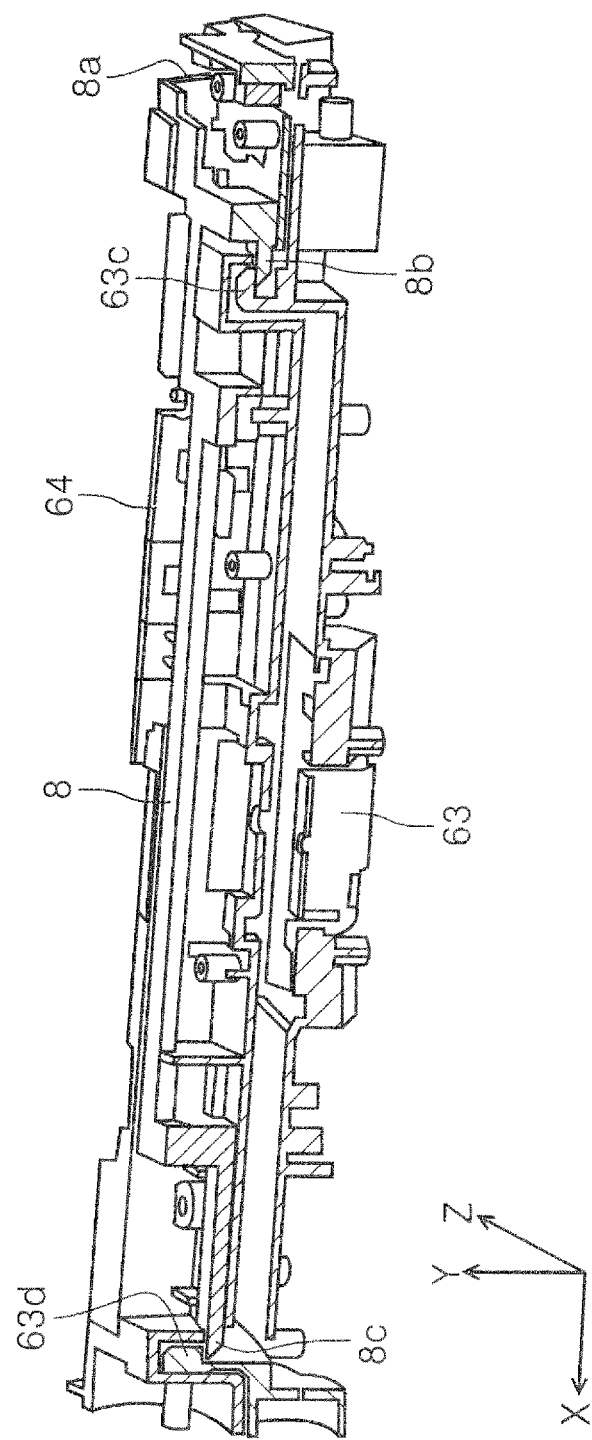
FIG. 8 is a cross-sectional view of a structure for locking the second unit.

As illustrated in FIG. 8, on the first frame 63 constituting the base body of the first unit 3, a first lock portion 63c and a second lock portion 63d are formed at a distance from each other in the X-axis direction. On the lock member 8, a first to-be-locked portion 8b and a second to-be-locked portion 8c are formed at a distance from each other in the X-axis direction. As illustrated in FIG. 8, the lock member 8, namely, the second unit 4, is locked onto the first frame 63, namely, the first unit 3, by an overlap of the first to-be-locked portion 8b and the first lock portion 63c and by an overlap of the second to-be-locked portion 8c and the second lock portion 63d. When the lock member 8 is slid in the −X direction from the state illustrated in FIG. 8, the overlap of the first to-be-locked portion 8b and the first lock portion 63c is eliminated, and the overlap of the second to-be-locked portion 8c and the second lock portion 63d is eliminated. By this means, it is possible to unlock the second unit 4 from the first unit 3 and then to open the second unit 4.

Next, with reference to FIG. 12, a power transmission mechanism 79 configured to transmit power from the transporting motor 50 to each roller will now be explained. Except for various rollers and the flap 35 that have already been described, all of components illustrated in FIG. 12 constitute the power transmission mechanism 79. All of reference signs S1 to S7 in FIG. 12 denote rotation shafts. The axial center of rotation of every one of the rotation shafts S1 to S7 extends in parallel with the X axis.

The transporting motor 50 is provided at the −X-directional end of the first unit 3. A driving pulley 51 is provided on the rotation shaft of the transporting motor 50. A driving force is transmitted from the driving pulley 51 to a driven pulley 53 via a belt 52. A gear that is not illustrated is formed integrally on the driven pulley 53. This gear is in mesh with a gear 54. A gear that is not illustrated is provided on the −X-directional end of the rotation shaft S1 of the second lower rollers 21. This gear is in mesh with the gear 54 to drive the rotation shaft S1.

A group of gears 80 is provided at the +X-directional end of the apparatus body 2. The group of gears 80 rotates by receiving motive power from the rotation shaft S1 and transmits a driving force to each roller.

Figure 13:
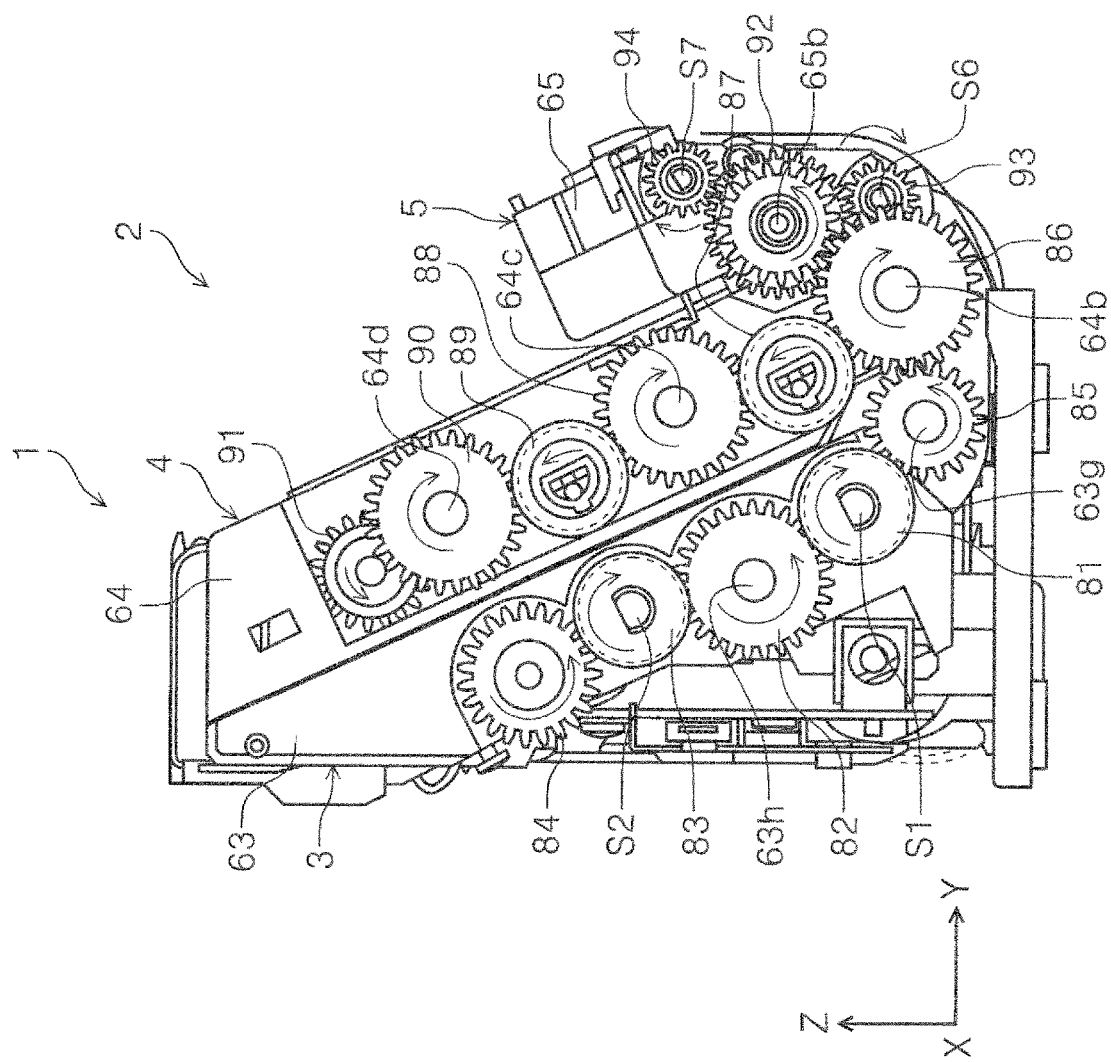
FIG. 13 is a side view of the structure for transmitting motive power from the transporting motor to each roller.

With reference to FIG. 13, the group of gears 80 will now be explained. The arrow shown on each gear in FIGS. 13, 14, and 15 indicates a direction in which the gear rotates when a document is transmitted. For the purpose of making it easier to distinguish the gears from one another, ordinal numbers such as "first", "second", etc. will be used in their respective names below. The axial center of rotation of every one of the gears illustrated in FIGS. 13, 14, and 15 extends in parallel with the X axis.

As explained above, motive power to be transmitted by the group of gears 80 enters the group of gears 80 from the rotation shaft S1 of the second lower rollers 21. The rotation shaft S1 is supported by non-illustrated bearings of the first frame 63. A fourth gear 81 is provided on the rotation shaft S1.

A fifth gear 82 is in mesh with the fourth gear 81. The fifth gear 82 is supported on a gear shaft 63h provided on the first frame 63.

A sixth gear 83 is in mesh with the fifth gear 82. The sixth gear 83 is provided on the rotation shaft S2. The rotation shaft S2 is supported by non-illustrated bearings of the first frame 63.

A seventh gear 84 is in mesh with the sixth gear 83. The seventh gear 84 transmits motive power to its target of driving that is not illustrated.

Next, an eighth gear 85 is in mesh with the fourth gear 81. The eighth gear 85 is supported on a gear shaft 63*g* provided on the first frame 63.

Figure 9:
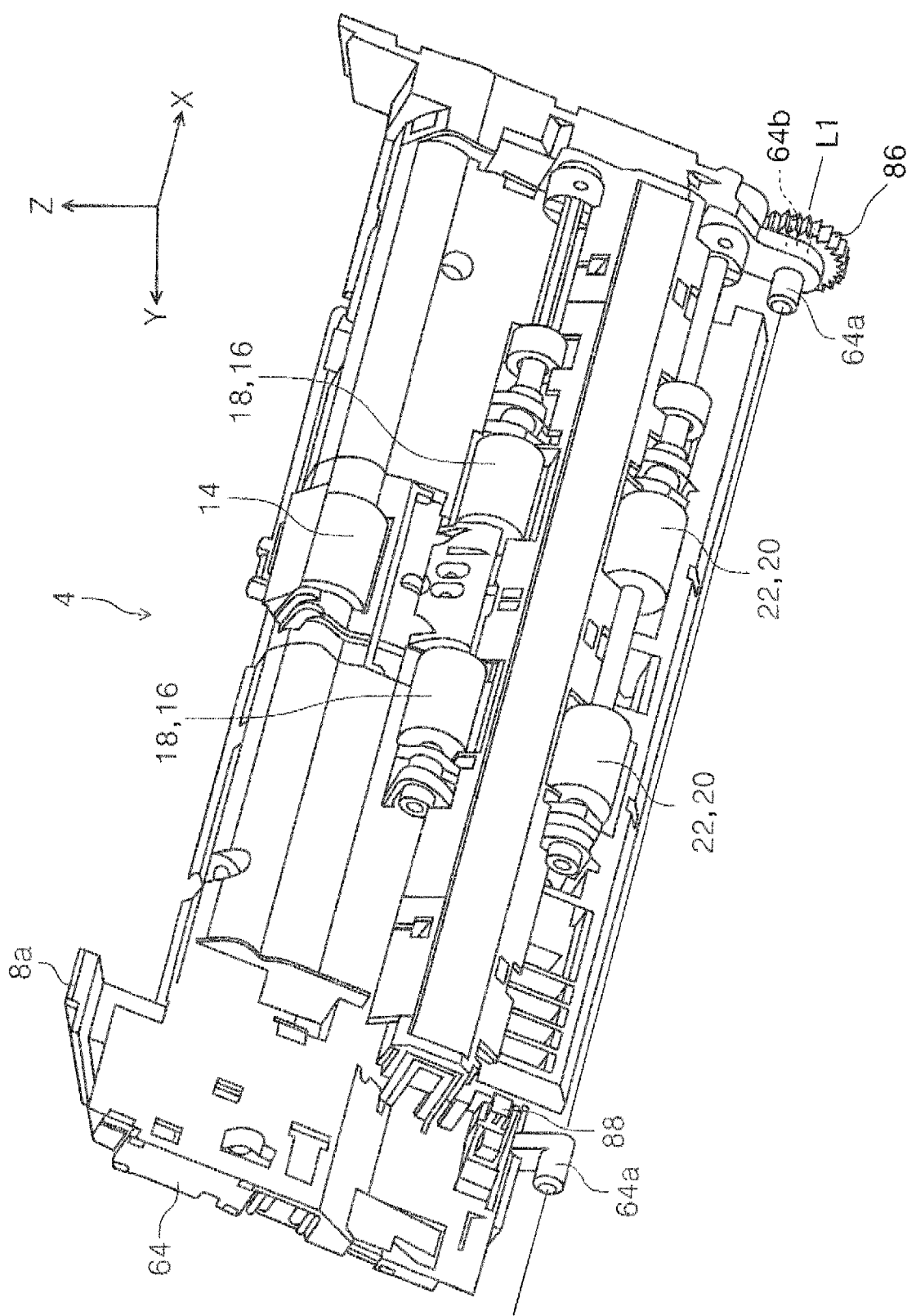
FIG. 9 is a perspective view of the second unit.

A first gear 86 is in mesh with the eighth gear 85. The first gear 86 is supported on a gear shaft 64*b* provided on the second frame 64. The gear shaft 64*b* is coaxial with the frame rotation shaft 64*a* (see FIG. 9). A line L1 of the axial center of rotation illustrated in FIG. 9 is a common line of the axial center of rotation for both of the gear shaft 64*b* and the second unit 4.

Referring back to FIG. 13, a second gear 87 is in mesh with the first gear 86. The second gear 87 is supported on the second frame 64 by a supporting portion that is not illustrated. The second gear 87 transmits a driving force to the rotation shaft S4 via a universal joint 96*a* as illustrated in FIG. 12. A universal joint 96*b* is provided on the −X-directional end of the rotation shaft S4. A driving force is transmitted to the second upper rollers 22 via the universal joint 96*b*.

Since the second upper rollers 22 are able to change in position toward and away from the second lower rollers 21, the presence of the universal joints 96*a* and 96*b* makes it possible to properly transmit motive power to the position-changeable second upper rollers 22.

Next, referring back to FIG. 13, a ninth gear 88 is in mesh with the second gear 87. The ninth gear 88 is supported on a gear shaft 64*c* provided on the second frame 64.

A tenth gear 89 is in mesh with the ninth gear 88. The tenth gear 89 is supported on the second frame 64 by a supporting portion that is not illustrated. The tenth gear 89 transmits a driving force to the rotation shaft S3 via a universal joint 95*a* as illustrated in FIG. 12. A universal joint 95*b* is provided on the −X-directional end of the rotation shaft S3. A driving force is transmitted to the first upper rollers 18 via the universal joint 95*b*.

Since the first upper rollers 18 are able to change in position toward and away from the first lower rollers 17, the presence of the universal joints 95*a* and 95*b* makes it possible to properly transmit motive power to the position-changeable first upper rollers 18.

Next, referring back to FIG. 13, an eleventh gear 90 is in mesh with the tenth gear 89. The eleventh gear 90 is supported on a gear shaft 64*d* provided on the second frame 64.

The eleventh gear 90 transmits motive power to a twelfth gear 91. The twelfth gear 91 transmits motive power to the feeding roller 14 via the rotation shaft S5 as illustrated in FIG. 12.

Next, in FIG. 13, a third gear 92 is in mesh with the first gear 86. The third gear 92 is supported on a gear shaft 65*b* provided on the third frame 65.

A thirteenth gear 93 and a fourteenth gear 94 are in mesh with the third gear 92.

The thirteenth gear 93 is provided on the rotation shaft S6. The rotation shaft S6 is supported by non-illustrated bearings of the third frame 65. The thirteenth gear 93 transmits motive power to the third driving rollers 25 via the rotation shaft S6.

The fourteenth gear 94 is provided on the rotation shaft S7. The rotation shaft S7 is supported by non-illustrated bearings of the third frame 65. The fourteenth gear 94 transmits motive power to the fourth driving rollers 29 via the rotation shaft S7.

The structure of the scanner 1 described above, and the operational effects thereof, can be summarized as follows. The scanner 1 includes the first unit 3 and the second unit 4. The second unit 4 is configured to be rotated in relation to the first unit 3 and configured to be closed onto, and opened away from, the first unit 3 by being rotated. The first unit 3 includes the transporting motor 50. The reading transportation path R2 for transportation of a document is formed when the second unit 4 is closed onto the first unit 3. The reading transportation path R2 is split open when the second unit 4 is opened away from the first unit 3.

The power transmission mechanism 79 transmits the motive power of the transporting motor 50 from the first unit 3 to the second unit 4. The power transmission mechanism 79 includes the first gear 86 and the second gear 87. The first gear 86 has the same axial center of rotation as that of the second unit 4. The second gear 87 is provided in the second unit 4 and is in mesh with the first gear 86.

Figure 14:
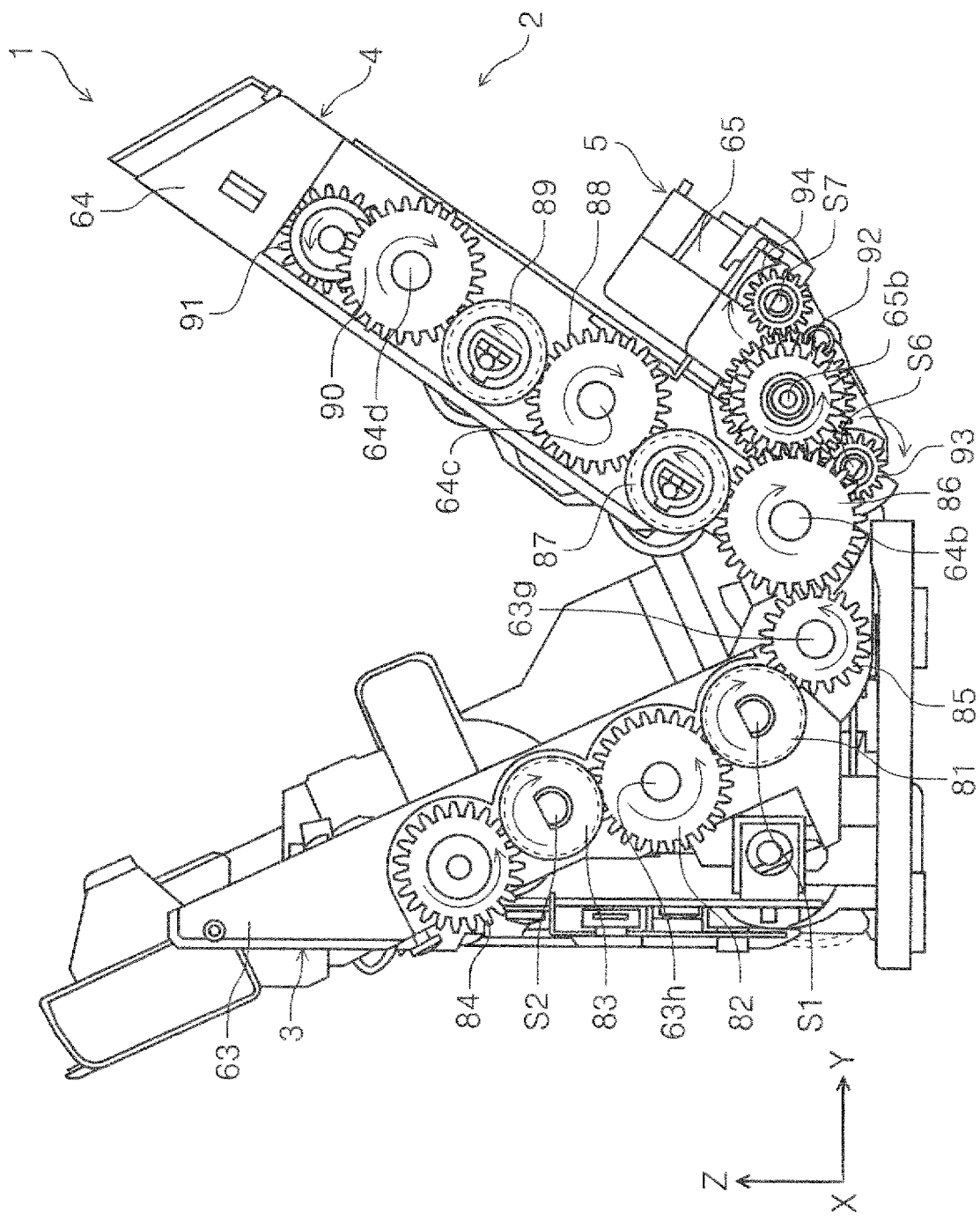
FIG. 14 is a side view of the structure for transmitting motive power from the transporting motor to each roller.

Therefore, when the second unit 4 is opened as shown by a change from FIG. 13 to FIG. 14, the second gear 87 remains in mesh with the first gear 86 though the second gear 87 moves around the first gear 86 by sun-and-planet motion. Since with this structure, it is possible to keep an appropriate backlash in the meshing of the first gear 86 and the second gear 87 and thus prevent a problem arising from a backlash change.

When a document is transported by the pair of first transporting rollers 16 and the pair of second transporting rollers 20, the second gear 87 rotates in a direction that is the opposite of a direction in which the first gear 86 rotates. Opening the second unit 4 causes the second gear 87 to rotate in a direction that is the opposite of the direction in which the second gear 87 rotates when the document is transported by the pair of first transporting rollers 16 and the pair of second transporting rollers 20. Closing the second unit 4 causes the second gear 87 to rotate in a direction that is the same as the direction in which the second gear 87 rotates when the document is transported by the pair of first transporting rollers 16 and the pair of second transporting rollers 20.

In the present embodiment, the transporting motor 50 is provided in the first unit 3, and the power transmission mechanism 79 transmits the motive power of the transporting motor 50 from the first unit 3 to the second unit 4. However, the transporting motor 50 may be provided in the second unit 4, and the power transmission mechanism 79 may transmit the motive power of the transporting motor 50 from the second unit 4 to the first unit 3.

In the present embodiment, as has been explained with reference to FIG. 9, the gear shaft 64*b* supporting the first gear 86 is formed separately from the frame rotation shaft 64*a* on the second frame 64. However, the first gear 86 may be supported by the frame rotation shaft 64*a*.

In the present embodiment, as has been explained with reference to FIG. 9, the gear shaft 64*b* supporting the first gear 86 is provided on the second frame 64, but is not limited thereto. The gear shaft 64*b* may be formed on the first frame 63 constituting the base body of the first unit 3 or on the third frame 65 constituting the base body of the third unit 5. Alternatively, the gear shaft 64*b* may be provided as a separate independent shaft member, instead of being formed integrally on any of the frames.

In the present embodiment, it is a gear (the eighth gear 85) that transmits motive power to the first gear 86. However, the component that transmits motive power to the first gear 86 is not limited to a gear. A belt may be used instead. The first gear 86 may be driven directly by a motor by providing the first gear 86 on the drive shaft of the motor.

The first reading portion 32 is provided in the first unit 3. The second reading portion 33 is provided in the second unit 4. The pair of first transporting rollers 16 is provided upstream of the first reading portion 32 and the second reading portion 33 on the document transportation path. The pair of second transporting rollers 20 is provided downstream of the first reading portion 32 and the second reading portion 33 on the document transportation path.

The pair of first transporting rollers 16 includes the first lower rollers 17, with which the lower surface of the document that is being transported comes into contact in the first unit 3, and the first upper rollers 18, with which the upper surface of the document that is being transported comes into contact in the second unit 4. The pair of second transporting rollers 20 includes the second lower rollers 21, with which the lower surface of the document comes into contact in the first unit 3, and the second upper rollers 22, with which the upper surface of the document comes into contact in the second unit 4. The transporting motor 50 drives the first lower rollers 17, the first upper rollers 18, the second lower rollers 21, and the second upper rollers 22 via the power transmission mechanism 79. That is, all of these rollers are driven by the transporting motor 50. Therefore, it is possible to transport a thick document reliably.

The first upper rollers 18 are configured to be advanced toward, and be moved back from, the first lower rollers 17, and are pushed toward the first lower rollers 17. The second upper rollers 22 are configured to be advanced toward, and be moved back from, the second lower rollers 21, and are pushed toward the second lower rollers 21. Because of this structure, the second unit 4, which includes the first upper rollers 18 and the second upper rollers 22, receives a force in an opening direction from the first unit 3 when in a closed state. This force will be hereinafter referred to as "a first force".

The direction in which the first gear 86 rotates when the document is transported by the pair of first transporting rollers 16 and the pair of second transporting rollers 20 is the direction in which the first gear 86 applies, to the second gear 87, a force in a direction of opening the second unit 4. This force will be hereinafter referred to as "a second force".

Since both of the first force and the second force act in the direction of opening the second unit 4, the amount of backlash between the first gear 86 and the second gear 87 will be more stable than in a structure in which the direction in which the first force acts on the second unit 4 and the direction in which the second force acts on the second unit 4 are the opposite of each other.

The scanner 1 includes the third unit 5 configured to be rotated in relation to the first unit 3 and the second unit 4 and configured to be closed onto, and opened away from, the first unit 3 and the second unit 4 by being rotated. The turning-over transportation path R3 is formed when the third unit 5 is closed. The turning-over transportation path R3 is split open when the third unit 5 is opened.

The axial center of rotation of the third unit 5 is the same as that of the second unit 4. The power transmission mechanism 79 includes the third gear 92 that is provided in the third unit 5 and is in mesh with the first gear 86.

Figure 15:
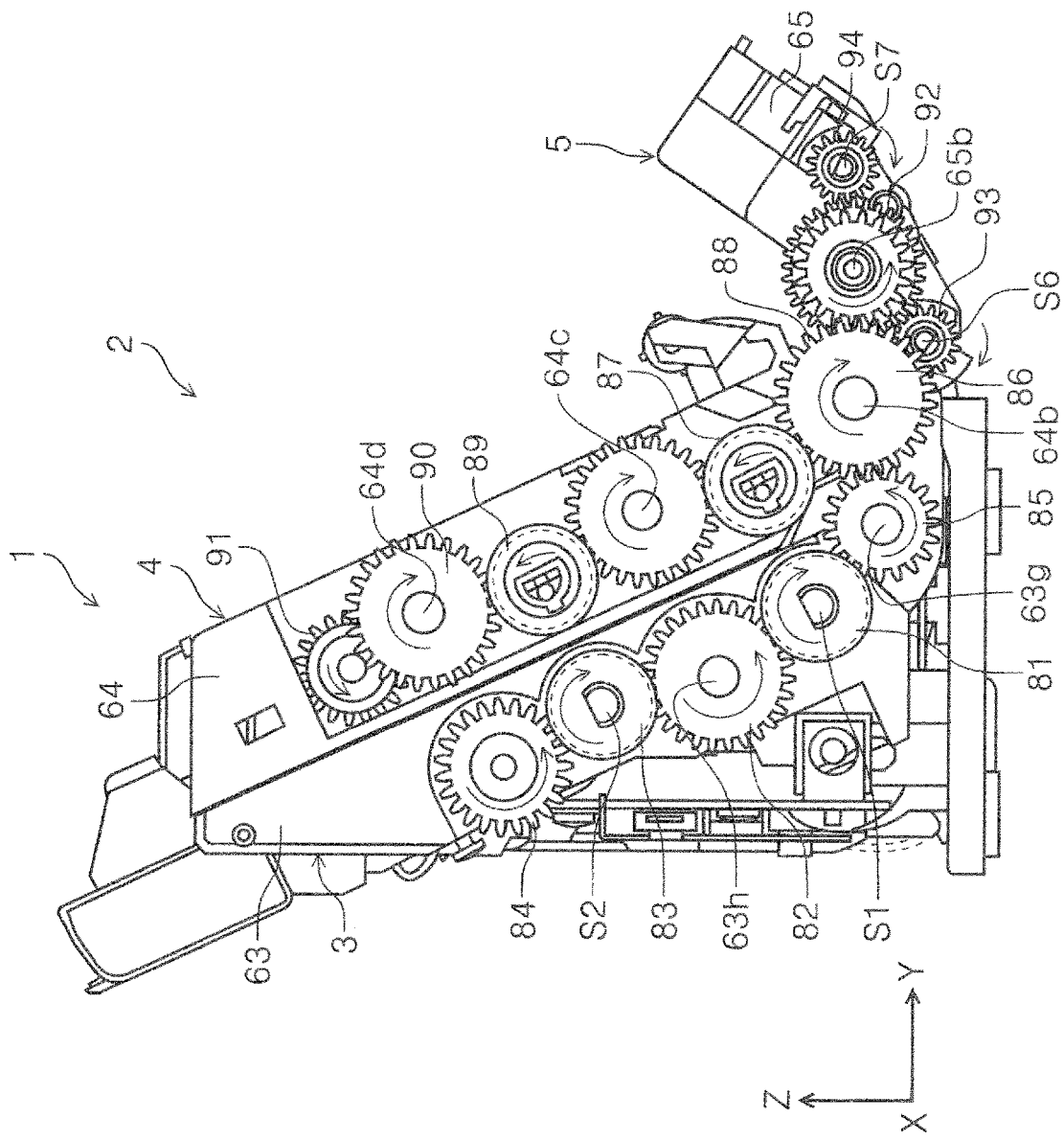
FIG. 15 is a side view of the structure for transmitting motive power from the transporting motor to each roller.

Therefore, when the third unit 5 is opened as shown by a change from FIG. 13 to FIG. 15, the third gear 92 remains in mesh with the first gear 86 though the third gear 92 moves around the first gear 86 by sun-and-planet motion. With this structure, it is possible to keep an appropriate backlash in the meshing of the first gear 86 and the third gear 92 and thus prevent a problem arising from a backlash change.

Gear illustration is omitted for a state of the third unit 5 having been opened from the state illustrated in FIG. 14, namely, opened from the state in which the second unit 4 is open with respect to the first unit 3 and in which the third unit 5 is not open with respect to the second unit 4. Though omitted, needless to mention, the meshing of the third unit 5 with the first gear 86 is kept also in this case.

In the present embodiment, the scanner 1 includes the third unit 5. However, the third unit 5 may be omitted.

The scanner 1 further includes the turning-over transportation path R3, the non-turning-over transportation path R4, and the flap 35. The turning-over transportation path R3 is a document transportation path which is located downstream of the reading transportation path R2 and is used when the read document is turned over and is ejected upward. The non-turning-over transportation path R4 is a document transportation path which is located downstream of the reading transportation path R2 and is used when the read document is ejected without being turned over. The flap 35 switches, to either one of the turning-over transportation path R3 and the non-turning-over transportation path R4, the document transportation path that is to be coupled to the reading transportation path R2. The flap 35 is an example of a transportation path switcher.

The turning-over transportation path R3 includes the pair of third transporting rollers 24, and the pair of fourth transporting rollers 28 located downstream of the pair of third transporting rollers 24. The turning-over transportation path R3 is formed between the second unit 4 and the third unit 5. The pair of third transporting rollers 24 includes the third driving rollers 25 and the third driven rollers 26. The third driving rollers 25 are rollers with which the lower surface of the document comes into contact in the third unit 5 and which are driven by the transporting motor 50. The third driven rollers 26 are rollers with which the upper surface of the document comes into contact in the second unit 4 and which rotate passively by being driven via the document in contact. The pair of fourth transporting rollers 28 includes the fourth driving rollers 29 and the fourth driven rollers 30. The fourth driving rollers 29 are rollers with which the lower surface of the document comes into contact in the third unit 5 and which are driven by the transporting motor 50. The fourth driven rollers 30 are rollers with which the upper surface of the document comes into contact in the second unit 4 and which rotate passively by being driven via the document in contact.

Since switching can be performed between the turning-over transportation path R3 and the non-turning-over transportation path R4, it is possible to transport a document that is less pliable well by using the non-turning-over transportation path R4.

The third driven rollers 26 are configured to be advanced toward, and be moved back from, the third driving rollers 25, and are pushed toward the third driving rollers 25. The fourth driven rollers 30 are configured to be advanced toward, and be moved back from, the fourth driving rollers 29, and are pushed toward the fourth driving rollers 29. Because of this structure, the third unit 5 receives a force in an opening direction from the second unit 4 when in a closed state. This force will be hereinafter referred to as "a third force".

The direction in which the first gear 86 rotates when the document is transported by the pair of third transporting rollers 24 and the pair of fourth transporting rollers 28 is the direction in which the first gear 86 applies, to the third gear 92, a force in a direction of opening the third unit 5. This force will be hereinafter referred to as "a fourth force".

Since both of the third force and the fourth force act in the direction of opening the third unit 5, the amount of backlash between the first gear 86 and the third gear 92 will be more stable than in a structure in which the direction in which the third force acts on the third unit 5 and the direction in which the fourth force acts on the third unit 5 are the opposite of each other.

Figure 12:
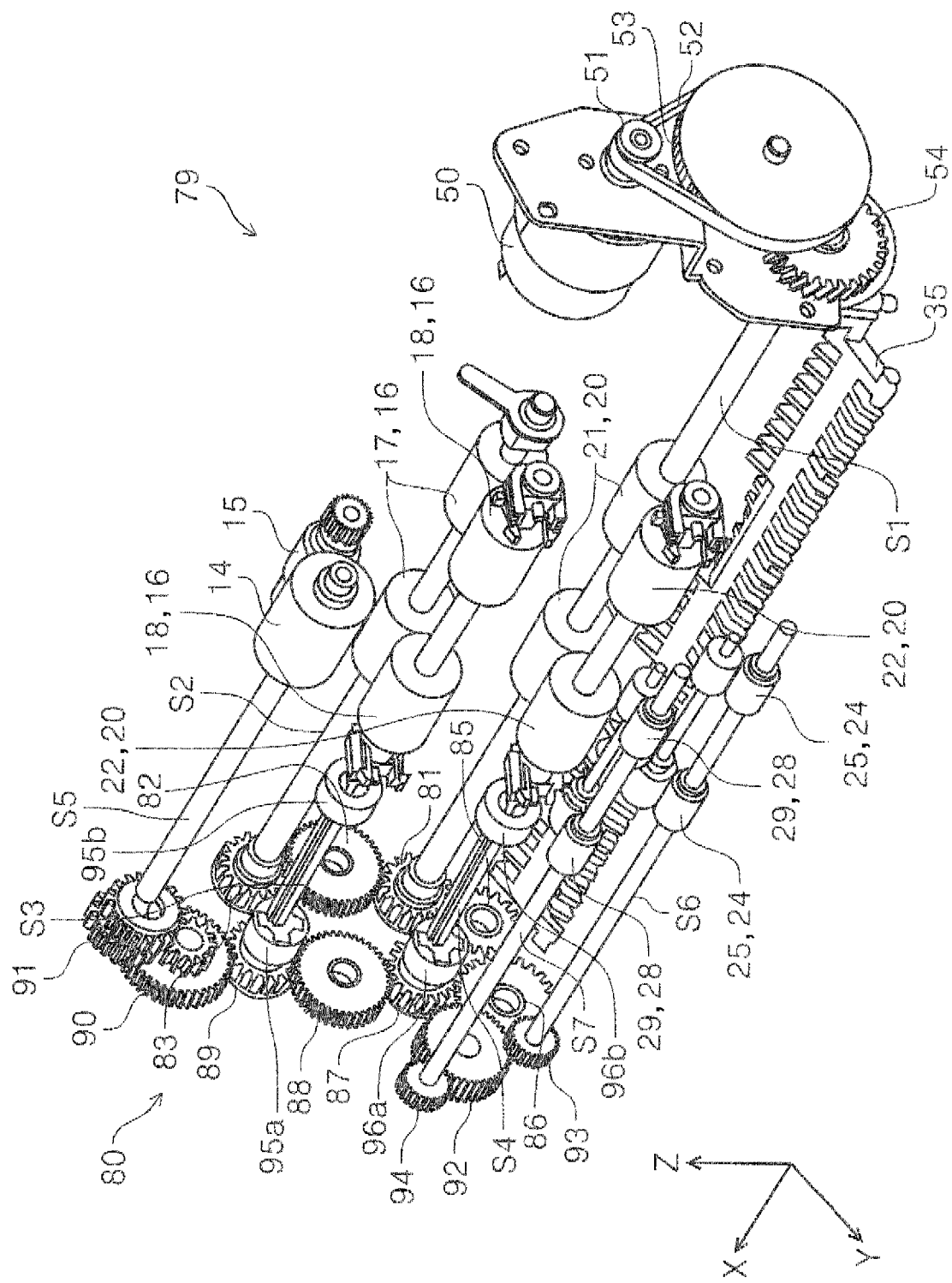
FIG. 12 is a perspective view of a structure for transmitting motive power from a transporting motor to each roller.

As illustrated in FIGS. 12 and 13, a plurality of gears that are included in the power transmission mechanism 79 and are provided in the first unit 3, specifically, the seventh gear 84, the sixth gear 83, the fifth gear 82, the fourth gear 81, and the eighth gear 85, are arranged along the reading transportation path R2 at the +X-directional side face of the first frame 63 constituting the base body of the first unit 3.

A plurality of gears that are included in the power transmission mechanism 79 and are provided in the second unit 4, specifically, the twelfth gear 91, the eleventh gear 90, the tenth gear 89, the ninth gear 88, the second gear 87, and the first gear 86, are arranged along the reading transportation path R2 at the +X-directional side face of the second frame 64 constituting the base body of the second unit 4. With this structure, it is possible to prevent an increase in size of the apparatus.

The scope of the present disclosure is not limited to the foregoing embodiments. The present disclosure can be modified in various ways within the scope of the recitation of appended claims. Needless to say, such modifications are also encompassed within the scope of the present disclosure.

What is claimed is:

1. An image reading apparatus, comprising:
a reading portion that reads an image of a document;
a first unit;
a second unit configured to be rotated in relation to the first unit and configured to be closed onto, and opened away from, the first unit by being rotated;
a motor provided in the first unit;
a power transmission mechanism that transmits motive power of the motor from the first unit to the second unit;
a pair of first transporting rollers; and
a pair of second transporting rollers, wherein
a document transportation path for transportation of the document is formed when the second unit is closed onto the first unit, and the document transportation path is split open when the second unit is opened away from the first unit,
the power transmission mechanism includes a first gear, which has a same axial center of rotation as that of the second unit, and a second gear, which is provided in the second unit and is in mesh with the first gear,
the reading portion includes a first reading portion, which is provided in the first unit and reads the image of the document transported along the document transportation path, and a second reading portion, which is provided in the second unit and reads the image of the document transported along the document transportation path,
the pair of first transportation rollers is located upstream of the first reading portion and the second reading portion on the document transportation path,
the pair of second transporting rollers is located downstream of the first reading portion and the second reading portion on the document transportation path,
the pair of first transporting rollers includes a first lower roller, with which a lower surface of the document that is being transported along the documnet transportation path comes into contact in the first unit, and a first upper roller, with which an upper surface of the document that is being transported along the document transportation path comes in to contact in the second unit,
the pair of second transporting rollers includes a second lower roller, with which the lower surface of the document comes into contact, in the first unit, and a second upper roller, with which the upper surface of the document comes into contact in the second unit, and
the motor drives the first lower roller, the first upper roller, the second lower roller, and the second upper roller via the power transmission mechanism.

2. The image reading apparatus according to claim 1, wherein
the first upper roller is configured to be advanced toward, and be moved back from, the first lower roller, and is pushed toward the first lower roller,
the second upper roller is configured to be advanced toward, and be moved back from, the second lower roller, and is pushed toward the second lower roller, and
a direction in which the first gear rotates when the document is transported by the pair of first transporting rollers and the pair of second transporting rollers is a direction in which the first gear applies, to the second gear, a force in a direction of opening the second unit.

3. The image reading apparatus according to claim 1, further comprising:
a third unit configured to be rotated in relation to the first unit and the second unit and configured to be closed onto, and opened away from, the first unit and the second unit by being rotated,
an axial center of rotation of the third unit is the same as that of the second unit, and
the power transmission mechanism includes a third gear that is provided in the third unit and is in mesh with the first gear.

4. The image reading apparatus according to claim 3, further comprising:
a turning-over transportation path that is a document transportation path located downstream of a reading transportation path and is used when the read document is turned over and is ejected upward, wherein the reading transportation path is defined as a document transportation path between the pair of first transporting rollers and the pair of second transporting rollers;
a non-turning-over transportation path that is a document transportation path located downstream of the reading transportation path and is used when the read document is ejected without being turned over;
a transportation path switcher that switches, to either one of the turning-over transportation path and the non-turning-over transportation path, the document transportation path that is to be coupled to the reading transportation path;
a pair of third transporting rollers that is provided on the turning-over transportation path and is located downstream of the pair of second transporting rollers;
a pair of fourth transporting rollers that is provided on the turning-over transportation path and is located downstream of the pair of third transporting rollers;
the turning-over transportation path is formed between the second unit and the third unit,
the pair of third transporting rollers includes a third driving roller, with which the lower surface of the document comes into contact in the third unit and which is driven by the motor, and a third driven roller, with which the upper surface of the document comes into contact in the second unit and which rotates passively by being driven via the document in contact, and the pair of fourth transporting rollers includes a fourth driving roller, with which the lower surface of the document comes into contact in the third unit and which is driven by the motor, and a fourth driven roller, with which the upper surface of the document comes into contact in the second unit and which rotates passively by being driven via the document in contact.

5. The image reading apparatus according to claim 4, wherein the third driven roller is configured to be advanced toward, and be moved back from, the third driving roller, and is pushed toward the third driving roller, the fourth driven roller is configured to be advanced toward, and be moved back from, the fourth driving roller, and is pushed toward the fourth driving roller, and a direction in which the first gear rotates when the document is transported by the pair of third transporting rollers and the pair of fourth transporting rollers is a direction in which the first gear applies, to the third gear, a force in a direction of opening the third unit.

6. The image reading apparatus according to claim 4, wherein a plurality of gears that are included in the power transmission mechanism and are provided in the first unit are arranged along the reading transportation path at a side face of a first frame constituting a base body of the first unit, and a plurality of gears that are included in the power transmission mechanism and are provided in the second unit are arranged along the reading transportation path at a side face of a second frame constituting a base body of the second unit.

7. The image reading apparatus according to claim 1, wherein the first upper roller is configured to be advanced toward, and be moved back from, the first lower roller, and is pushed toward the first lower roller, the second upper roller is configured to be advanced toward, and be moved back from, the second lower roller, and is pushed toward the second lower roller, and the motive power of the motor is transmitted to the first upper roller and the second upper roller via a universal joint.

8. An image reading apparatus, comprising:
a reading portion that reads an image of a document;
a first unit;
a second unit configured to be rotated in relation to the first unit and configured to be closed onto, and opened away from, the first unit by being rotated;
a motor provided in the second unit;
a power transmission mechanism that transmits motive power of the motor from the second unit to the first unit,
a pair of first transporting rollers; and
a pair of second transporting rollers, wherein
a document transportation path for transportation of a document is formed when the second unit is closed onto the first unit, and the document transportation path is split open when the second unit is opened away from the first unit,
the power transmission mechanism includes a first gear, which has a same axial center of rotation as that of the second unit, and a second gear, which is provided in the second unit and is in mesh with the first gear, the reading portion includes a first reading portion, which is provided in the first unit and reads the image of the document transported along the document transportation path, and a second reading portion, which is provided in the second unit and reads the image of the document transported along the document transportation path, the pair of first transporting rollers is located upstream of the first reading portion and the second reading portion on the document transportation path, the pair of second transporting rollers is located downstream of the first reading portion and the second reading portion on the document transportation path, the pair of first transporting rollers includes a first lower roller, with which a lower surface of the document that is being transported along the document transportation path comes into contact in the first unit, and a first upper roller, with which an upper surface of the document that is being transported along the document transportatoin path comes into contact in the second unit, the pair of second transporting rollers includes a second lower roller, with which the lower surface of the document comes into contact in the first unit, and a second upper roller, with which the upper surcface of the documnet comes into contact in the second unit, and the motor drives the first lower roller, the first upper roller, the second lower roller, and the second upper roller via the power transmission mechanism.

9. An image reading apparatus, comprising:
a reading portion that reads an image of a document;
a first unit;
a second unit configured to be rotated in relation to the first unit and configured to be closed onto, and opened away from, the first unit by being rotated;
a motor provided in the first unit;
a power transmission mechanism that transmits motive power of the motor from the first unit to the second unit;
a pair of first transporting rollers; and
a pair of second transporting rollers, wherein
a document transportation path for transportation of the document is formed when the second unit is closed onto the first unit, and the document transportation path is split open when the second unit is opened away from the first unit,
the power transmission mechanism includes a first gear and a second gear, wherein the second gear is provided in the second unit and is in mesh with the first gear,
the reading portion includes a first reading portion, which is provided in the first unit and reads the image of the document transported along the document transportation path, and a second reading portion, which is provided in the second unit and reads the image of the document transported along the document transportation path,
the pair of first transporting rollers is located upstream of the first reading portion and the second reading portion on the document transportation path,
the pair of second transporting rollers is located downstream of the first reading portion and the second reading portion on the document transportation path,
the pair of first transporting rollers includes a first lower roller, with which a lower surface of the document that is being transported along the document transportation path comes into contact in the first unit, and a first upper roller, with which an upper surface of the document that is being transported along the document transportation path comes into contact in the second unit, the pair of second transporting rollers includes a second lower roller, with which the lower surface of the document comes into contact in the first unit, and a second upper roller, with which the upper surface of the document comes into contact in the second unit, and the motor drives the first lower roller, the first upper roller, the second lower roller, and the second upper roller via the power transmission mechanism.

10. An image reading apparatus, comprising:

a reading portion that reads an image of a document;

a first unit;

a second unit configured to be rotated in relation to the first unit and configured to be closed onto, and opened away from, the first unit by being rotated;

a motor provided in the second unit;

a power transmission mechanism that transmits motive power of the motor from the second unit to the first unit, a pair of first transporting rollers; and a pair of second transporting rollers, wherein a document transportation path for transportation of a document is formed when the second unit is closed onto the first unit, and the document transportation path is split open when the second unit is opened away from the first unit, the power transmission mechanism includes a first gear and a second gear, wherein the second gear is provided in the second unit and is in mesh with the first gear, the reading portion includes a first reading portion, which is provided in the first unit and reads the image of the document transported along the document transportation path, and a second reading portion, which is provided in the second unit and reads the image of the document transported along the document transportation path, the pair of first transporting rollers is located upstream of the first reading portion and the second reading portion on the document transportation path, the pair of second transporting rollers is located downstream of the first reading portion and the second reading portion on the document transportation path, the pair of first transporting rollers includes a first lower roller, with which a lower surface of the document that is being transported along the document transportation path comes into contact in the first unit, and a first upper roller, with which an upper surface of the document that is being transported along the document transportation path comes into contact in the second unit, the pair of second transporting rollers includes a second lower roller, with which the lower surface of the document comes into contact in the first unit, and a second upper roller, with which the upper surface of the document comes into contact in the second unit, and the motor drives the first lower roller, the first upper roller, the second lower roller, and the second upper roller via the power transmission mechanism.

* * * * *